United States Patent [19]
Cordy

[11] Patent Number: 5,347,986
[45] Date of Patent: Sep. 20, 1994

[54] SOLAR POWERED HIGH PRESSURE STEAM GENERATOR

[76] Inventor: Clifford B. Cordy, 2134 Beall La., Central Point, Oreg. 97502-1555

[21] Appl. No.: 13,811

[22] Filed: Feb. 2, 1993

[51] Int. Cl.[5] .............................................. F24J 2/38
[52] U.S. Cl. .................................... 126/574; 126/576; 126/601; 126/605; 126/690
[58] Field of Search .............................. 126/573–582, 126/600–608, 688–691

[56] References Cited

U.S. PATENT DOCUMENTS

| | | | |
|---|---|---|---|
| 509,393 | 11/1893 | Paine | 126/603 |
| 3,977,773 | 8/1976 | Hubbard | 126/607 |
| 4,030,890 | 6/1977 | Diggs | 126/573 |
| 4,031,385 | 6/1977 | Zerlaut et al. | 126/578 |
| 4,111,184 | 9/1978 | Fletcher et al. | 126/577 |
| 4,206,746 | 6/1980 | Chubb | 126/689 |
| 4,273,103 | 6/1981 | Uroshevich | 126/690 |
| 4,290,411 | 9/1981 | Russell | 126/574 |
| 4,320,288 | 3/1982 | Schlarlack | 126/574 |
| 4,333,446 | 6/1982 | Smyth | 126/574 |
| 4,340,031 | 7/1982 | Niedermeyer | 126/600 |
| 4,354,484 | 10/1982 | Malone et al. | 126/574 |
| 4,363,354 | 12/1982 | Strickland | 126/573 |
| 4,449,514 | 5/1984 | Selchk | 126/688 |
| 4,452,232 | 6/1984 | David | 126/574 |
| 4,821,705 | 4/1989 | Trihey | 126/574 |

Primary Examiner—Carroll B. Dority

[57] ABSTRACT

A point focus distributed receiver system for generating high-pressure steam by means of solar energy collection is disclosed. The cradle within which a gimbal mounted concentrator dish rotates is designed to withstand high wind forces by delivering all forces along the polar axis to the equatorial end of the cradle, requires only one structural member to withstand flexural forces and provides an unobstructed volume behind the axis of rotation for the concentrator dish to rotate in. The concentrator dish comprises a plurality of segments whose bracing forms a tee-pee-like structure behind the dish. The receiver of the present invention further discloses a receiver cavity which achieves maximum blackness in a minimum depth and volume, a combined heat shield-/secondary reflector and a plumbing system which permits the receiver system to operate successfully when the concentrator dish is nearly perpendicular to the ground.

16 Claims, 28 Drawing Sheets

Minimum operating angle of elevation shadows from 103 receiver supports shadow from 90 receiver

SOLAR POWERED HIGH PRESSURE STEAM GENERATOR

BACKGROUND OF THE INVENTION

This invention is in the field of steam generation using solar energy. In particular, a preferred embodiment of the present invention describes a point focus distributed receiver for generating high-pressure steam.

Solar energy has been used in numerous ways and for numerous purposes almost from the beginning of recorded human history. From the passive solar energy absorption/radiation of an Indian adobe building which kept the building cool in the daytime and warm at night to the photoelectric solar panels on a telecommunications satellite which provide electricity to its circuits, solar energy has been used in innumerable ways for innumerable purposes.

As our society has learned the environmental costs of producing electricity from both fossil and nuclear fuels, more attention has been turned to the possibility of producing electricity using solar powered generating systems. At first glance, solar energy seems to offer a free energy source, the sun, with no or very low environmental costs.

Such a superficial assessment has proven to be completely wrong. Although the energy source itself is free and non-polluting, it is not continuously available, given the vagaries of clouds and seasons, not to mention the day/night cycle. In most regions, solar energy is not of very great power density, necessitating very large solar energy collectors. To make the generation of electricity from solar power cost competitive with known fossil fuel generators and nuclear power plants, the solar energy collectors must be designed to be inexpensive.

One known method of creating electricity from solar energy is the use of photoelectric cells. Sunlight falling on the semiconductor material of the cell generates free electrons in the material, thereby creating an electric current. Although such cells are conceptually simple, their manufacture is costly, requires a great deal of energy, generates a large amount of toxic waste and the energy conversion efficiency of the resultant cells is low. Attempts to increase the efficiency of these cells have been somewhat successful, but at the cost of using more exotic materials, further increasing the cost of the cells. At present, using photoelectric cells to generate electricity is not practical on a large scale, although they are used in remote areas and in outer space where conventional energy sources are unavailable.

Other systems for generating electricity using solar energy require a concentrator and a receiver, the concentrator intercepting the solar radiation and focusing it on the receiver, the receiver absorbing the focused solar radiation, convening the radiation to heat and transferring the heat to a working fluid. For a system to generate electricity, the working fluid must be heated to a high temperature. In the past several decades, many designs for high temperature solar collectors (the combination of the concentrator and receiver) have been proposed and numerous prototypes have been built.

These various designs of high temperature solar energy collectors can be broadly grouped into four categories. The first category is the trough collector, in which a trough, typically shaped as a parabola, focuses energy on a pipe that runs the length of the trough, the pipe being fixed at the focal point of the parabola. The trough is driven along one axis to track the sun. The second category is a fixed mirror, tracking receiver ("FMTR") system which uses a fixed spherical mirror as the concentrator. In an FMTR system, the receiver is suspended from the center of the sphere defined by the mirror and driven in two axes to track the image of the sun through its daily and seasonal motions. A third category, the central receiver, which is also known as the power tower, uses an array of mirrors, which mirrors are nearly flat, mounted around a tower, the tower having a single receiver. The mirrors are driven to follow a point halfway between the sun and receiver, as seen by each mirror, so that the solar image is kept focused on the receiver. The fourth category is a point focus, distributed receiver system. In this system, each concentrator has a receiver mounted on it, the receiver being fixed at the mirror's focus point. The receiver/mirror combination is driven to follow the sun through its daily and seasonal motions. Depending upon the amount of power that is required, a power generation system using point focus distributed receivers could comprise either one or a plurality of such collectors.

The common failing of these known solar energy systems is that they have not been cost competitive with fossil fuel heat generation. The economics of nuclear energy generation are beyond the scope of this patent disclosure. However, no new nuclear energy plant has been contracted for in the last five years. Consequently, the cost competitor for solar energy remains fossil fuels. In particular, the design of known solar systems has not dealt with the problems faced by such systems in a cost effective way.

One of the problems that solar energy generation systems face is the wind loading that the system must endure. Wind speeds can, on rare occasion, reach 50 m/s in most places suitable for solar energy production. Even higher wind speeds have been recorded in the hurricane belt. One proposed Department of Energy solar generation system would use collectors with a 15 m diameter. Such a collector, if it were required to meet ANSI standards for buildings (A58.1-1982), would have to survive a total force of 350,000N. Wind pressure is a major concern in the structural design of buildings, but it is an overwhelming concern in the design of moving solar collectors.

Most known solar collectors are built and mounted on monopods which are driven in altitude and azimuth. For large collectors, the monopod and its pier become very large and expensive. Also, the monopod can potentially interfere with the mechanical bracing of the concentrator dish itself. In high winds, the monopod and its attached concentrator dish must be driven to a stowed position quickly, which requires both a large motor and a large gearing system. Finally, monopods do not lend themselves to simple solar tracking mechanisms.

Another problem with known solar energy generation systems involves the working fluid, which can comprise a molten metal such as sodium, a liquid salt such as sodium chloride, various oils, or water. The working fluid must carry the thermal energy to the heat engine or process. Generally the fluid is both hot and at high pressure. As the solar collector moves, the thermal load remains fixed. Delivery of the solar generated heat to the thermal load thus requires a slip joint or a flexible coupling. In known systems, leaks at these joints and flexible couplings has proven to be a major problem. In some cases, the thermal load, generally a heat engine, is mounted in the immediate vicinity of the focal point of the concentrator, avoiding the need for plumbing to a stationary load.

In all solar energy systems, heat loss is a major problem. In trough collector systems, the advantage of a simpler, single axis drive system is more than offset by the large thermal losses of the system. Although heat loss is a particular problem in trough systems, it is present to some degree in all solar energy systems, reducing their overall efficiency and increasing their cost.

The combination of drive system complexity, fluid loss, thermal losses, and the expense of both system construction and site purchase has made solar energy as a means to generate electricity impractical. Without numerous improvements in known solar energy generation systems, the production of electricity by means of solar energy will not be cost-competitive with fossil fuels.

SUMMARY OF THE INVENTION

In its first preferred embodiment, the present invention comprises a single point focus distributed receiver which has been optimized to produce high-pressure steam at a much lower cost than that of known solar energy generators. This first embodiment of the present invention comprises a strong inexpensive concentrator dish, a cradle for holding the dish and for moving the dish to track the sun, an internal receiver mounted on the dish/cradle for receiving the concentrated solar energy and transferring that energy to the working fluid, a simplified drive system for the cradle/dish, an improved solar tracker and an optimized fluid circulation system. Although the description herein relates specifically to a distributed receiver high pressure steam generation system used to generate electricity, nothing herein should be taken to limit the invention described to only that application. It should be readily apparent that the teachings of this specification could be used with other types of solar energy systems as well.

It should also be understood that although only one concentrator/receiver is described herein, an economically effective electricity generation facility might require hundreds, if not thousands of such concentrators/receivers. Where discussion of the effects of having multiple concentrator dishes in close proximity is appropriate, it is included.

The present invention will now be described in detail, with reference to the figures listed and described below.

BRIEF DESCRIPTION OF THE ILLUSTRATIONS

FIGS. 1a, b, and c are three orthogonal views of a concentrator dish as taught by the present invention;

Figure 5D:
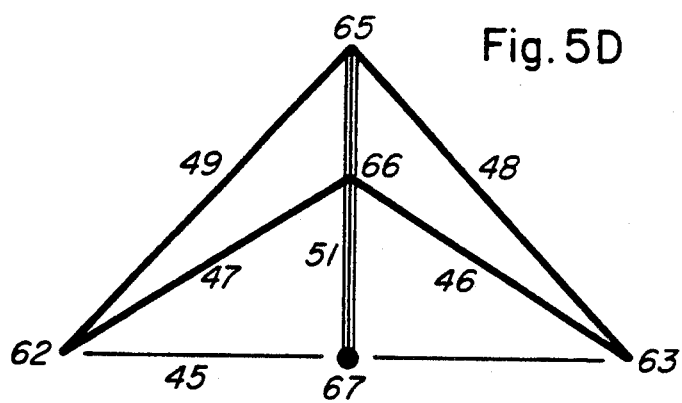
Figure 5A:
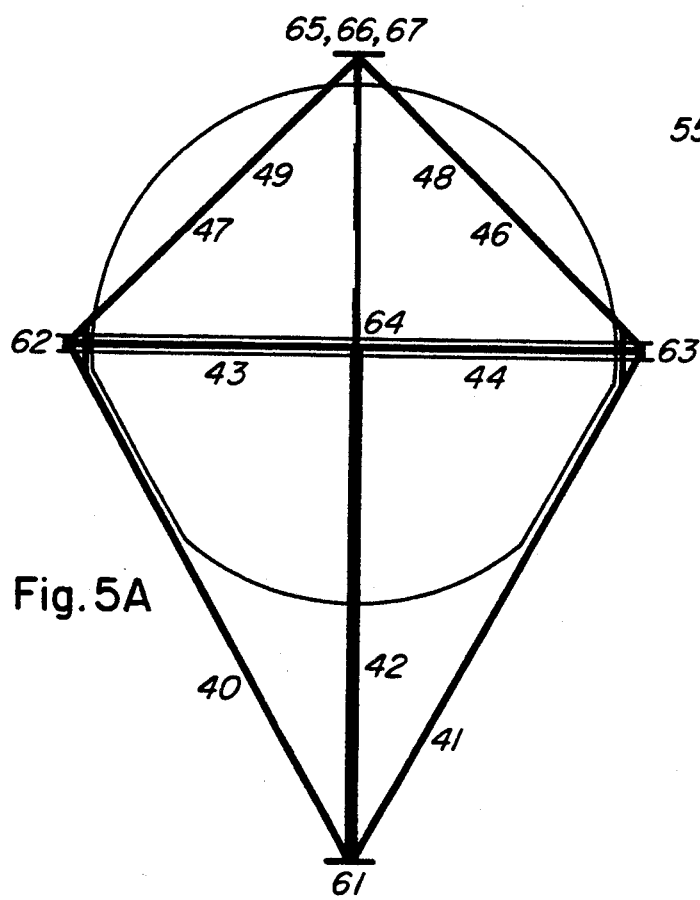
Figure 6:
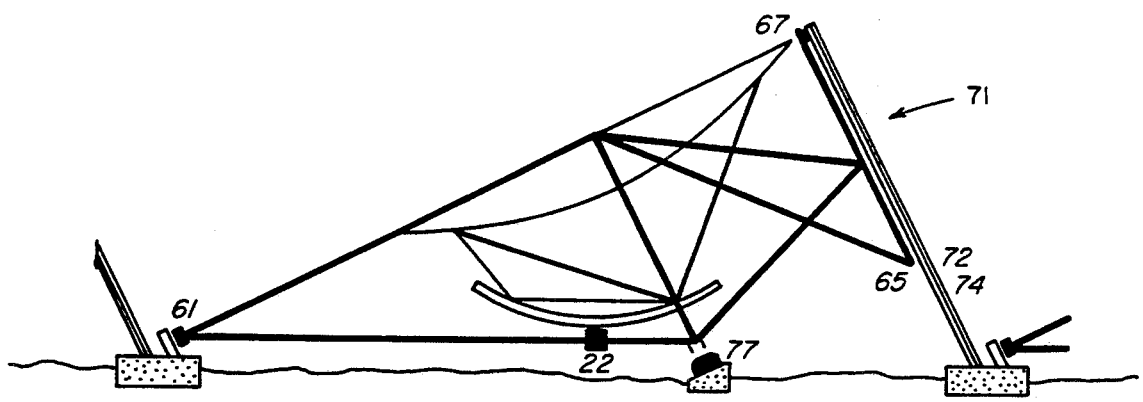
Figure 7:
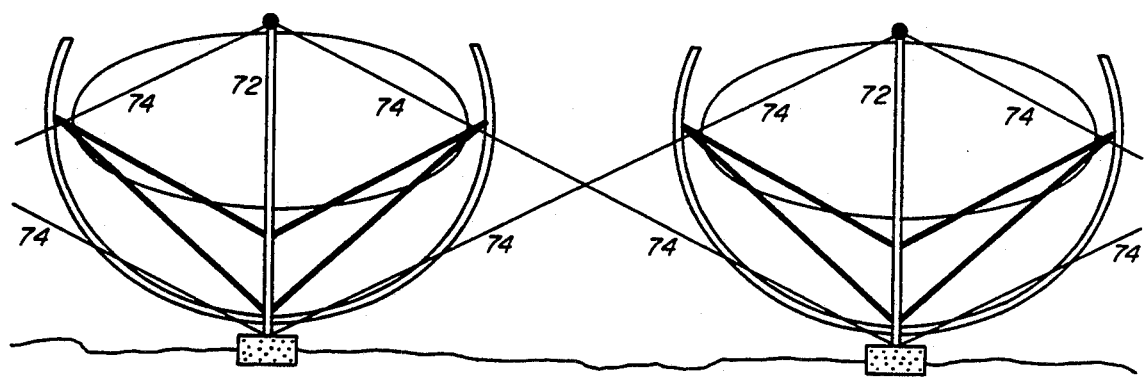
Figure 8:
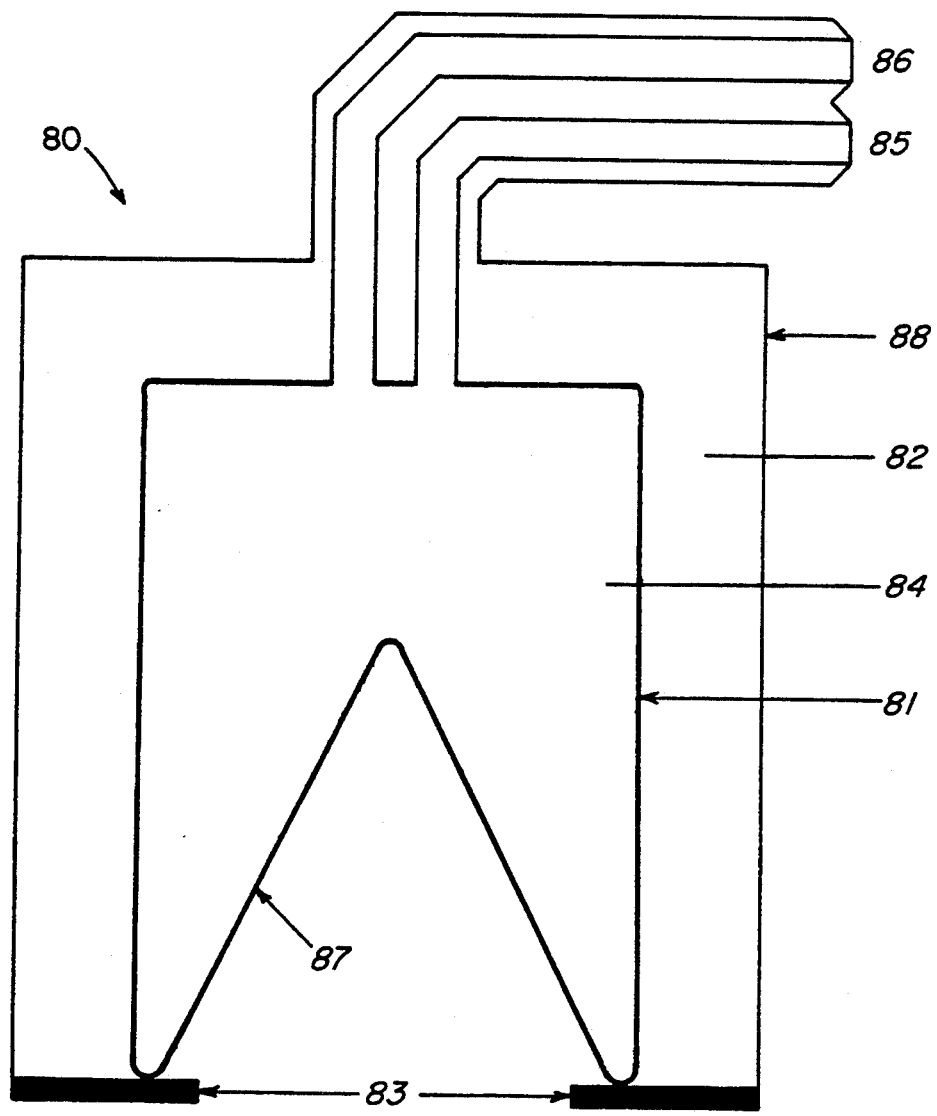
Figure 9:
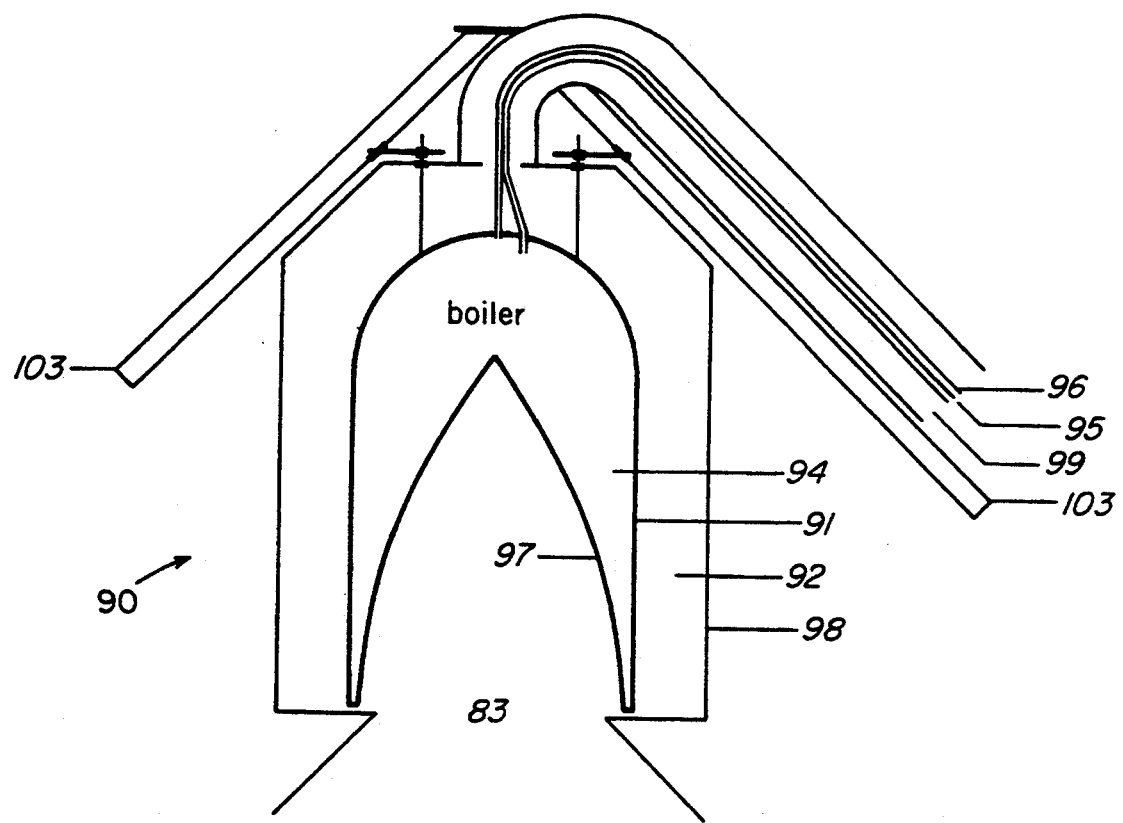
Figure 10B:
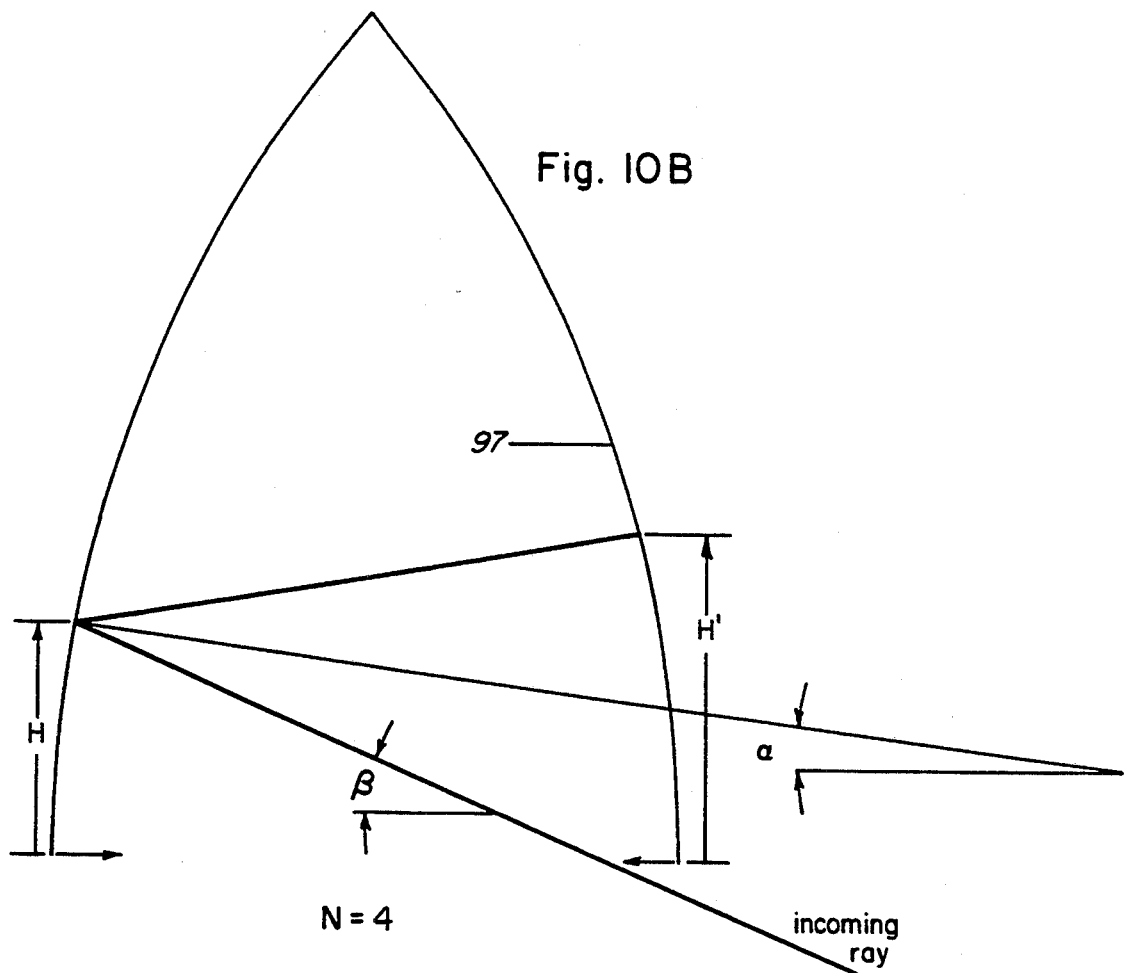
Figure 10A:
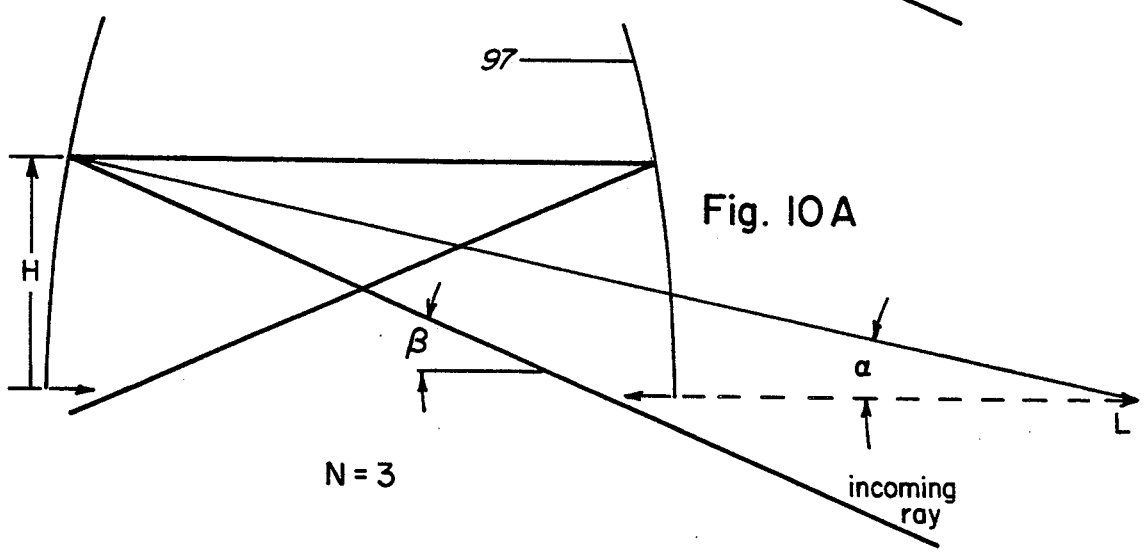
Figure 11:
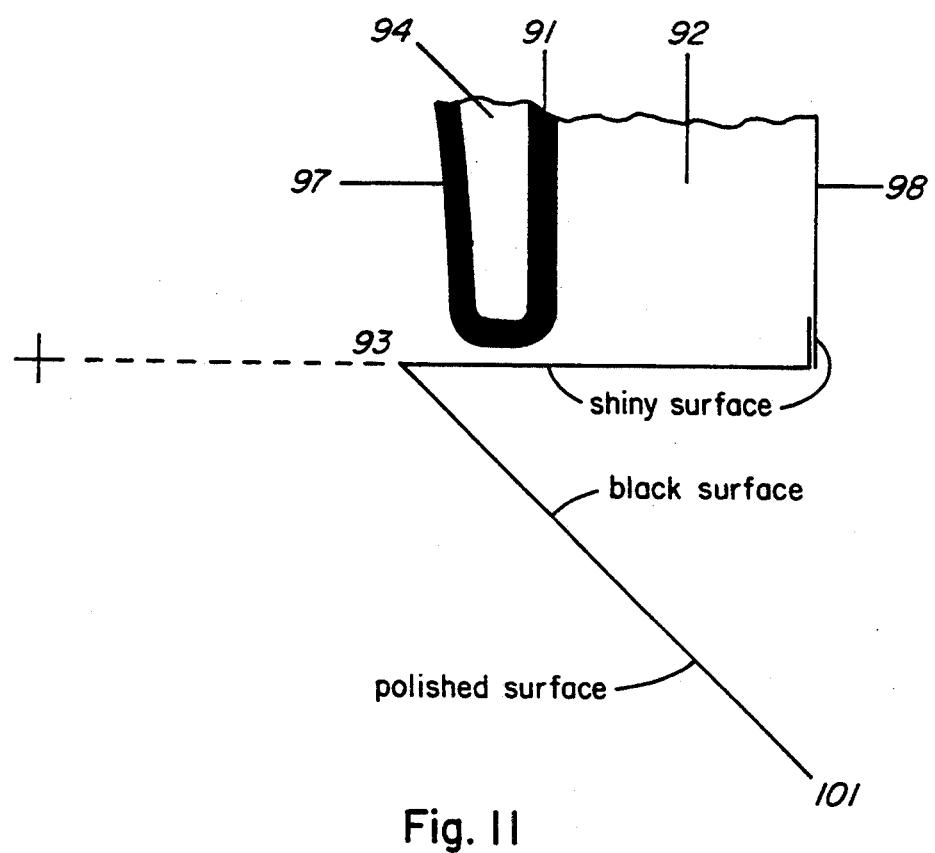
Figure 13A:
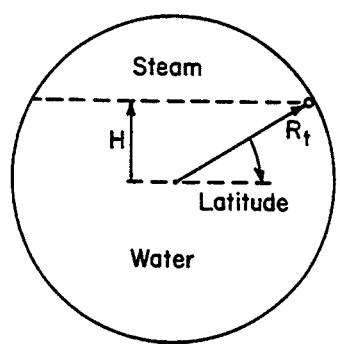
Figure 13B:
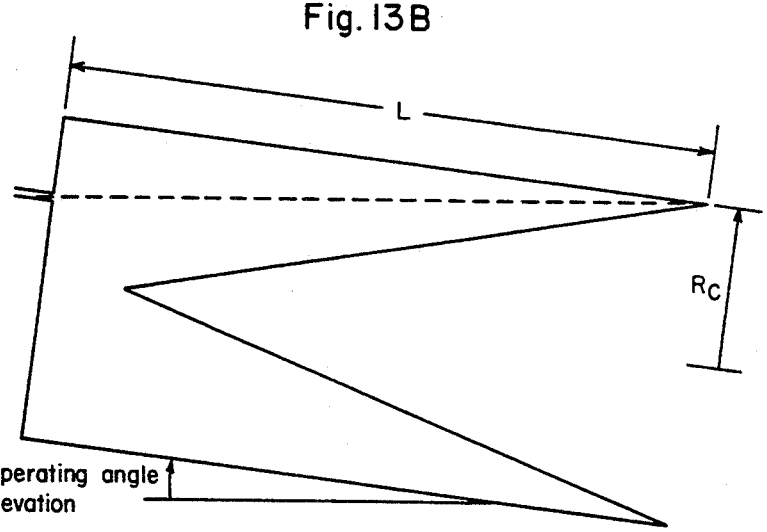
Figure 14:
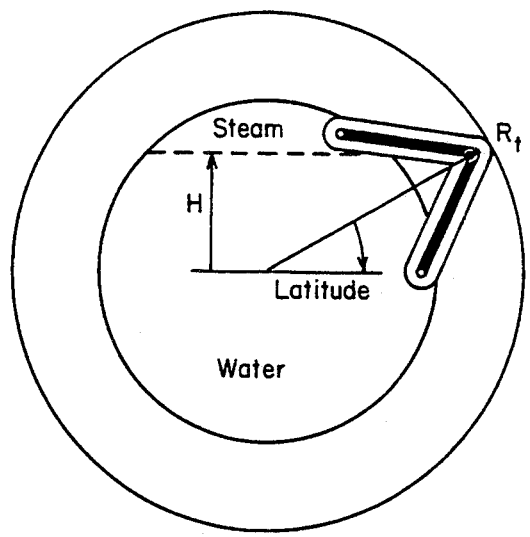
Figure 14:
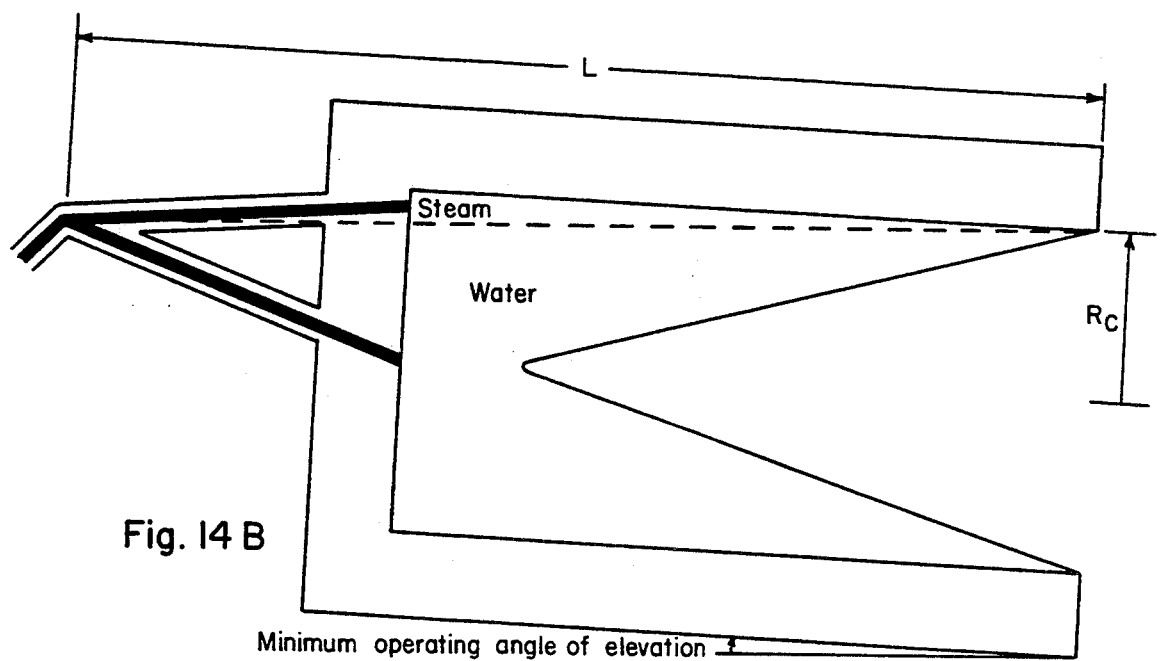
Figure 15:
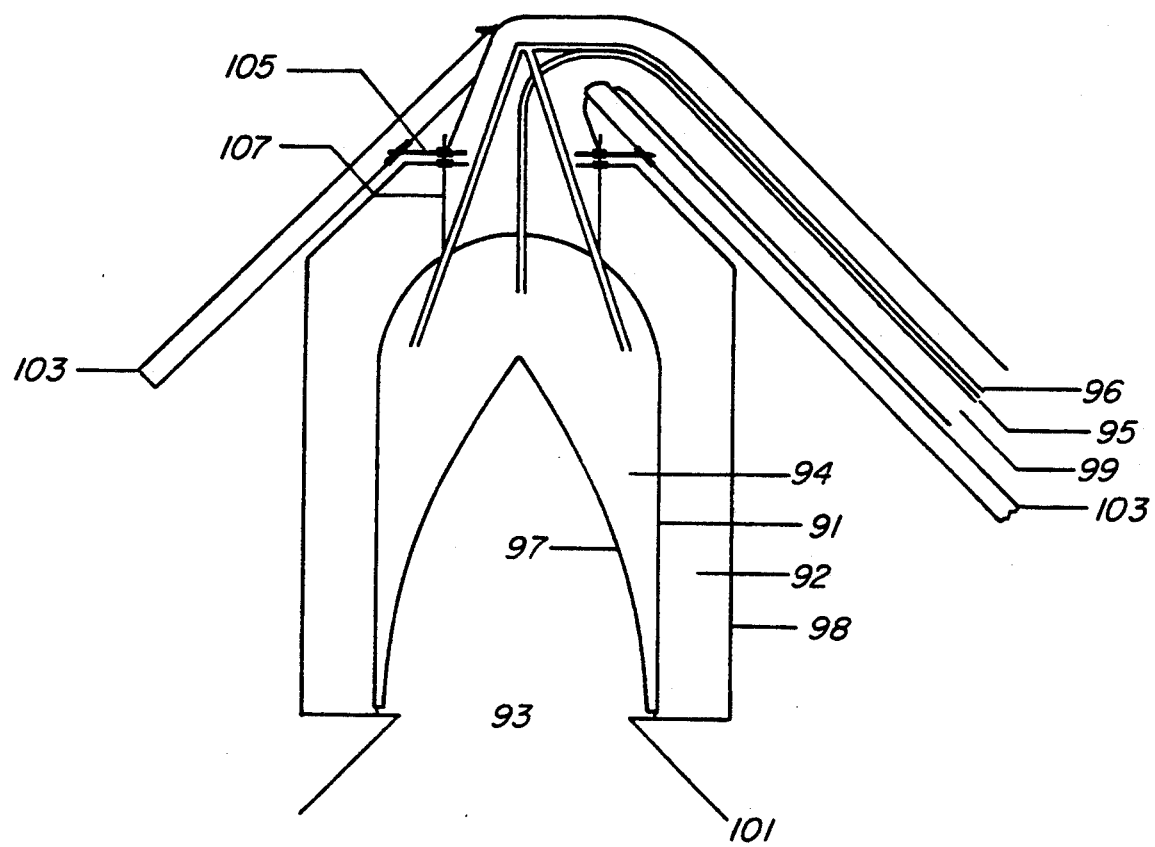
Figure 16A:
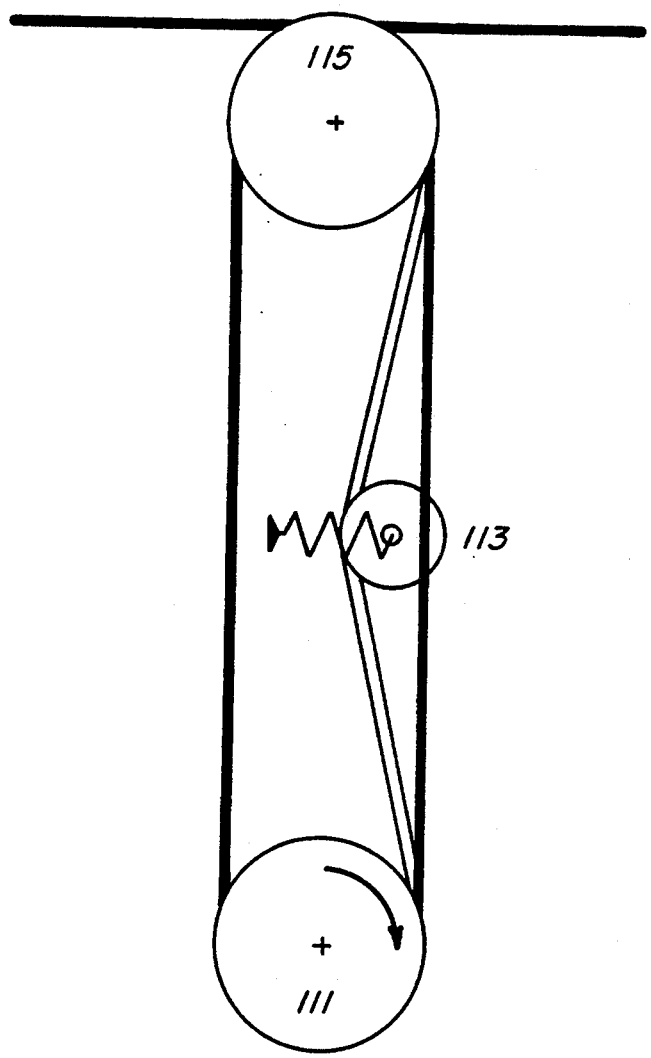
Figure 16B:
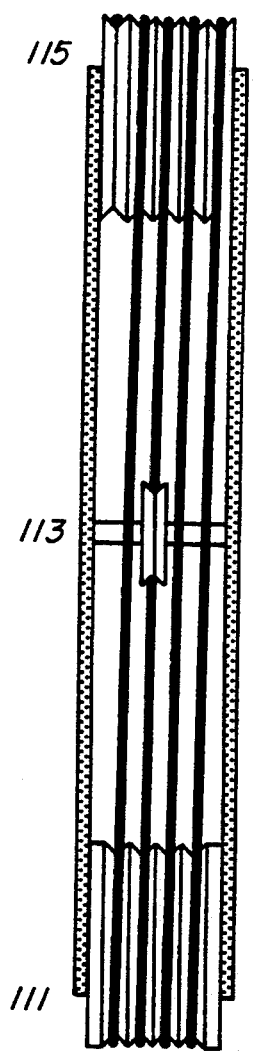
Figures 17A, 17B, 17C:
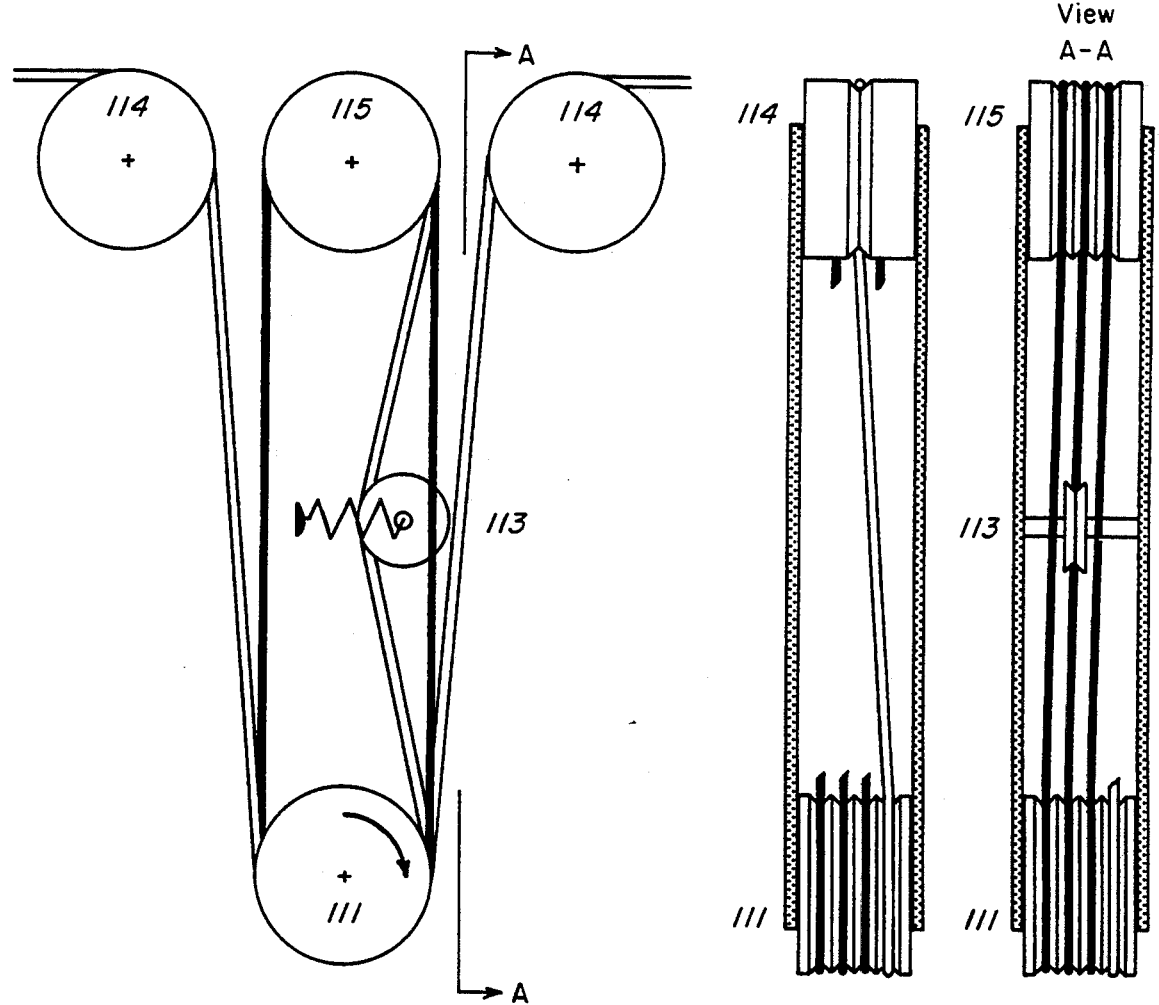
Figure 18A:
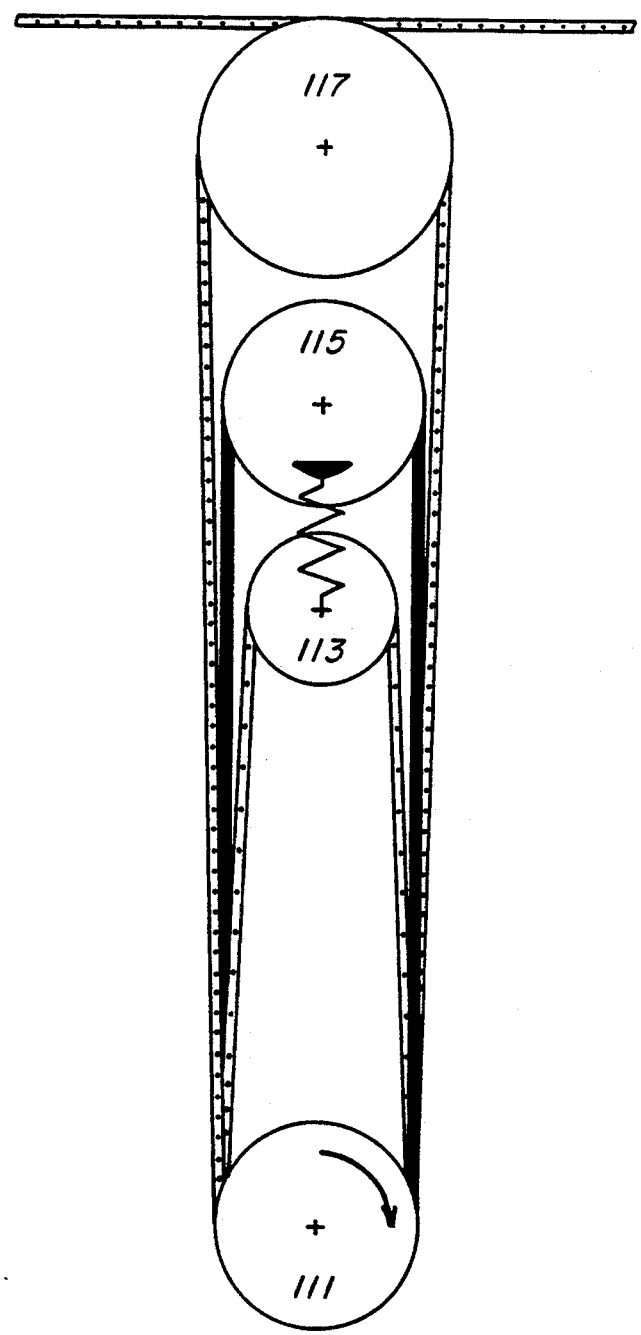
Figure 18B:
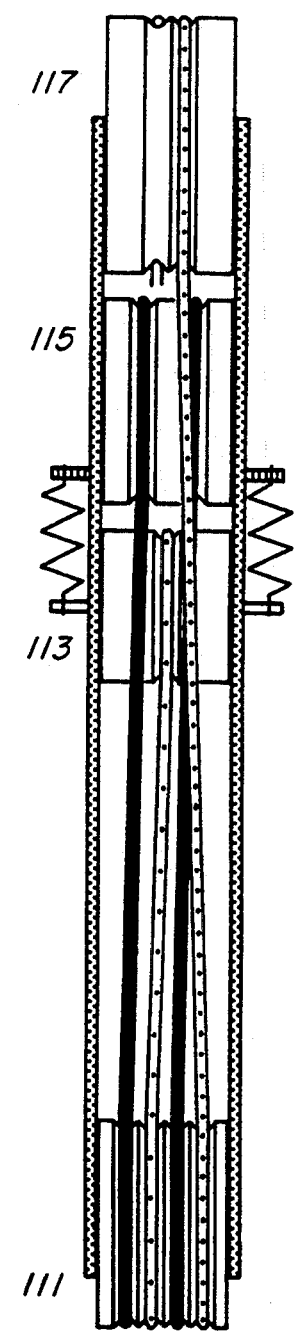
Figure 19:
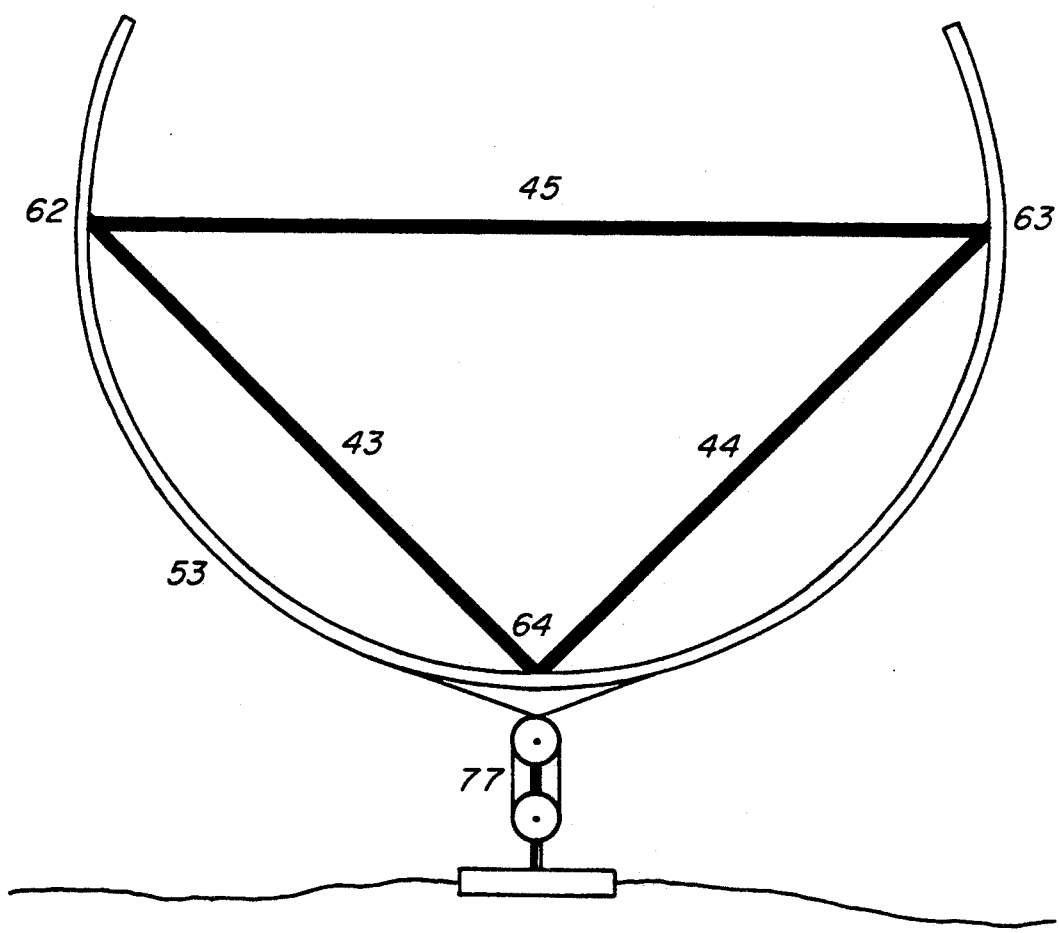
Figure 20:
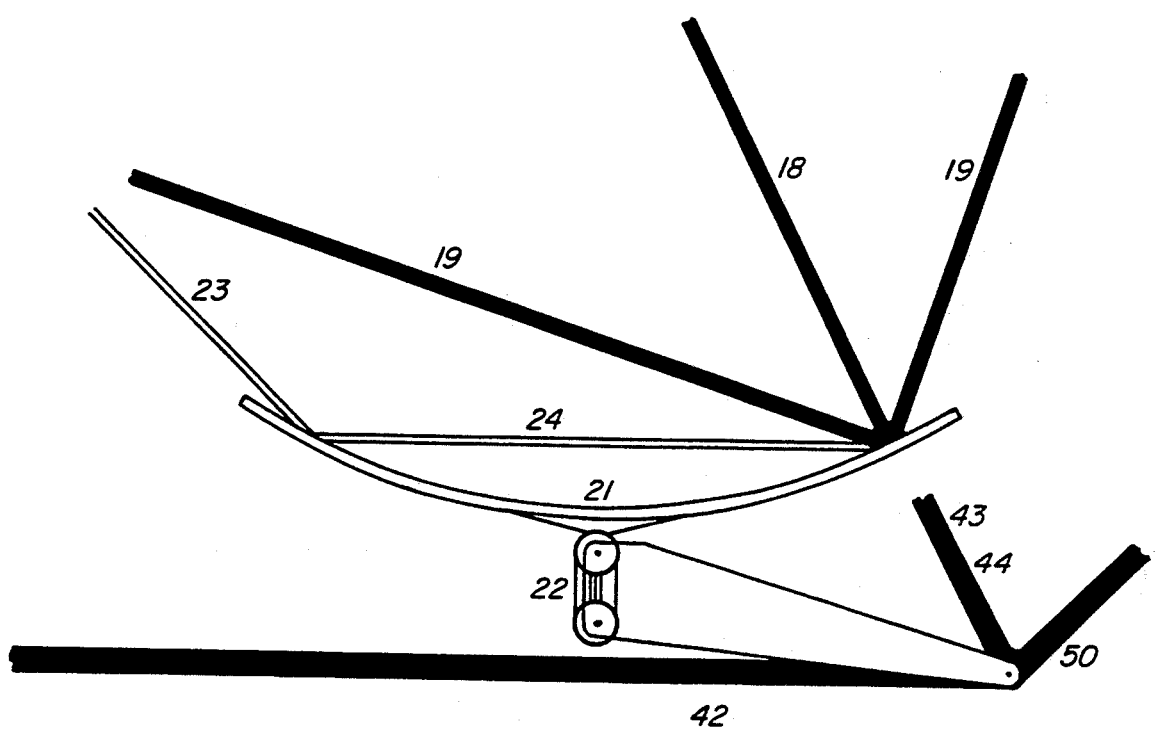
Figures 21A, 21B:
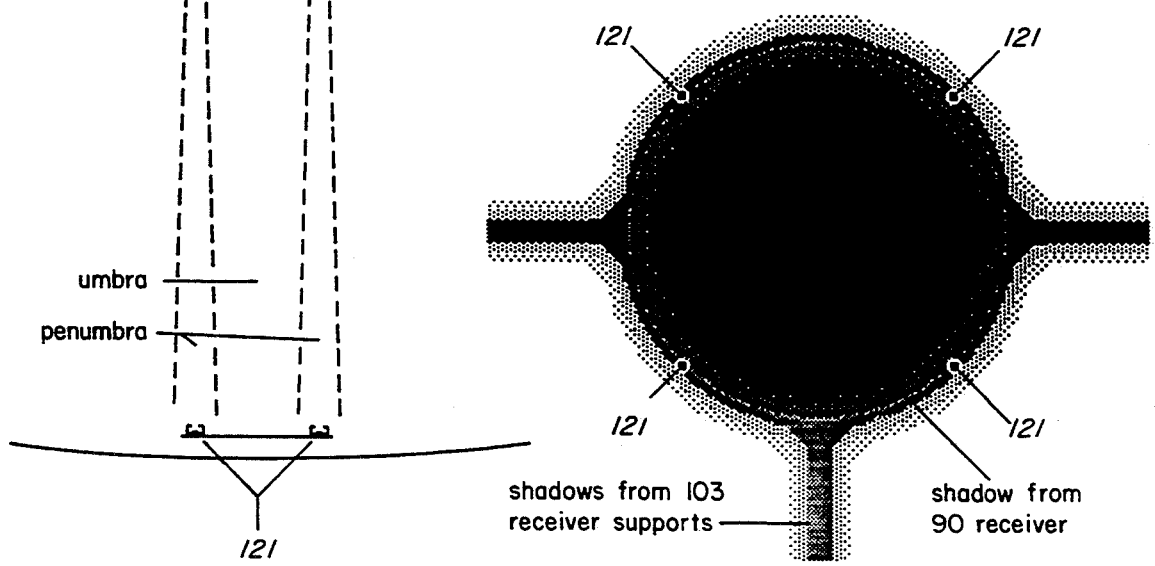
Figure 22:
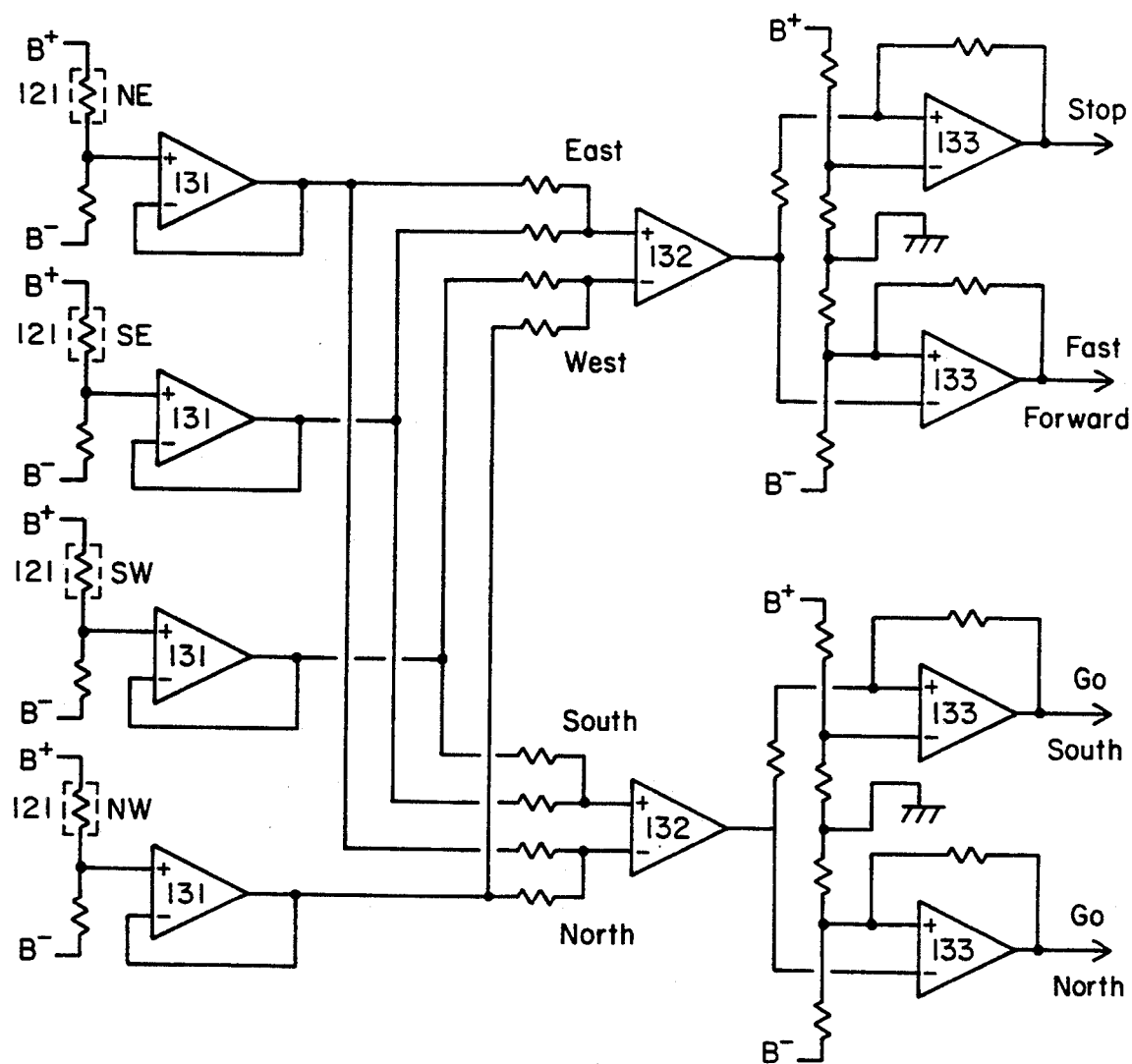
Figure 23:
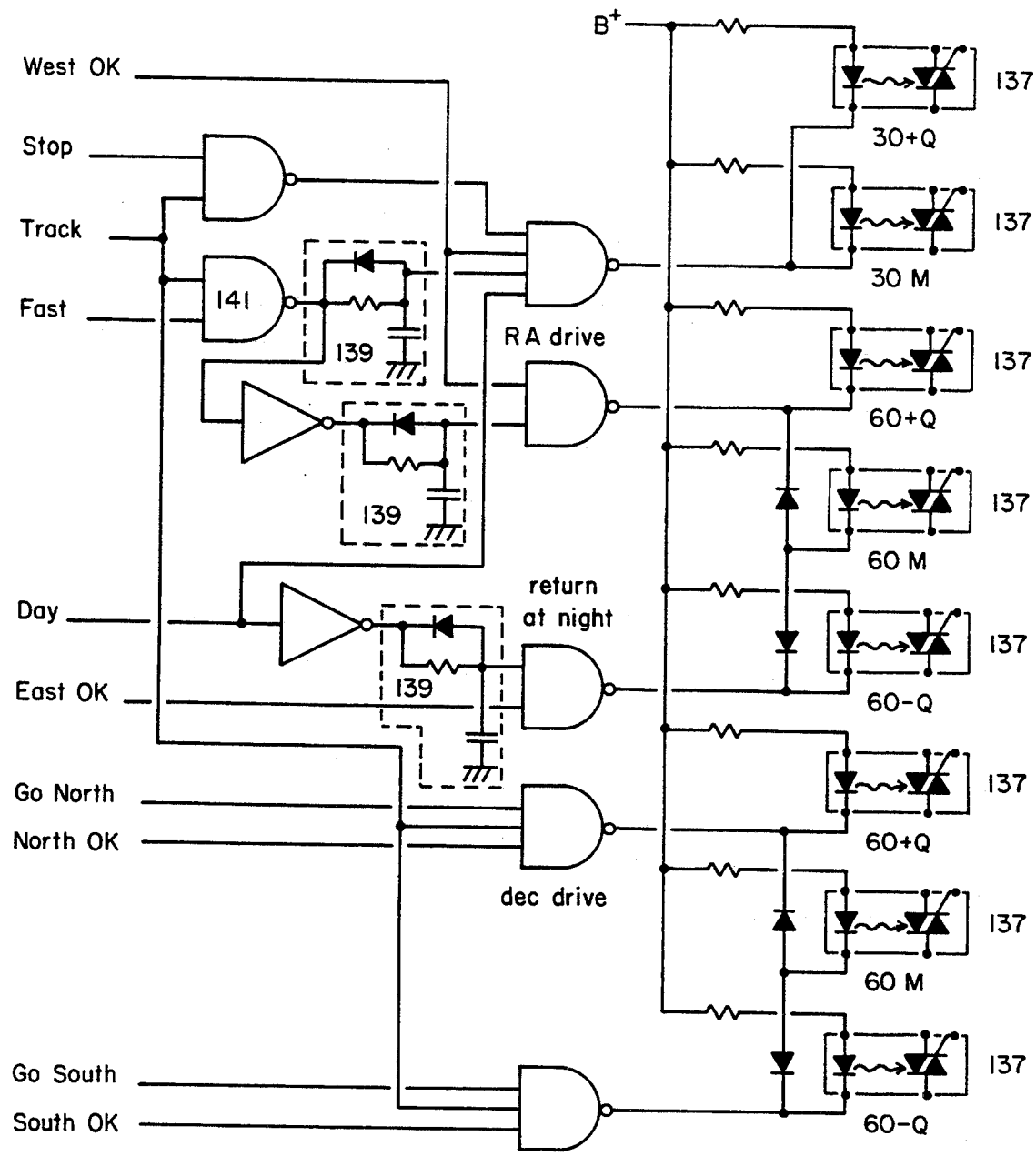
Figure 24:
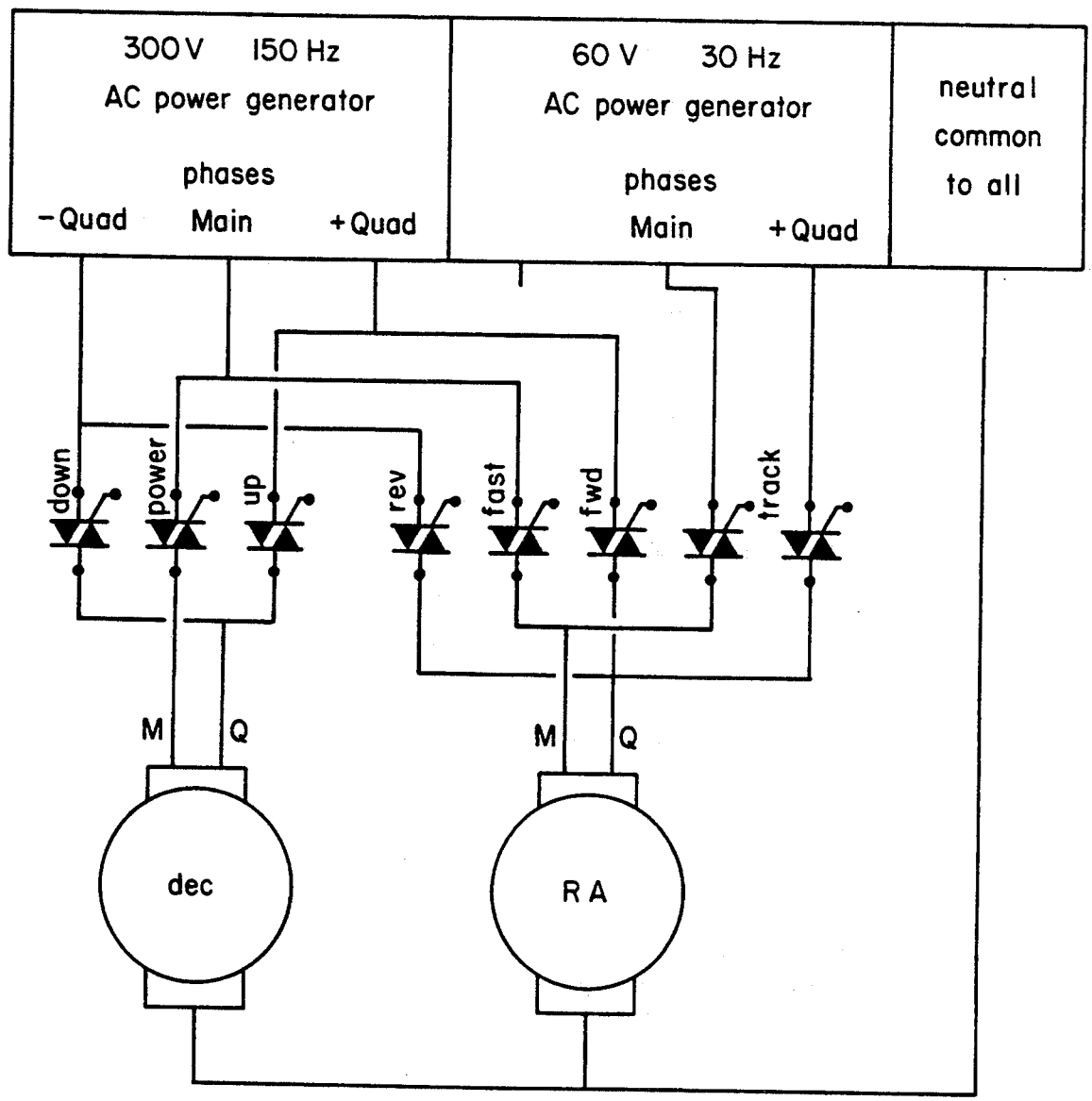
Figure 25:
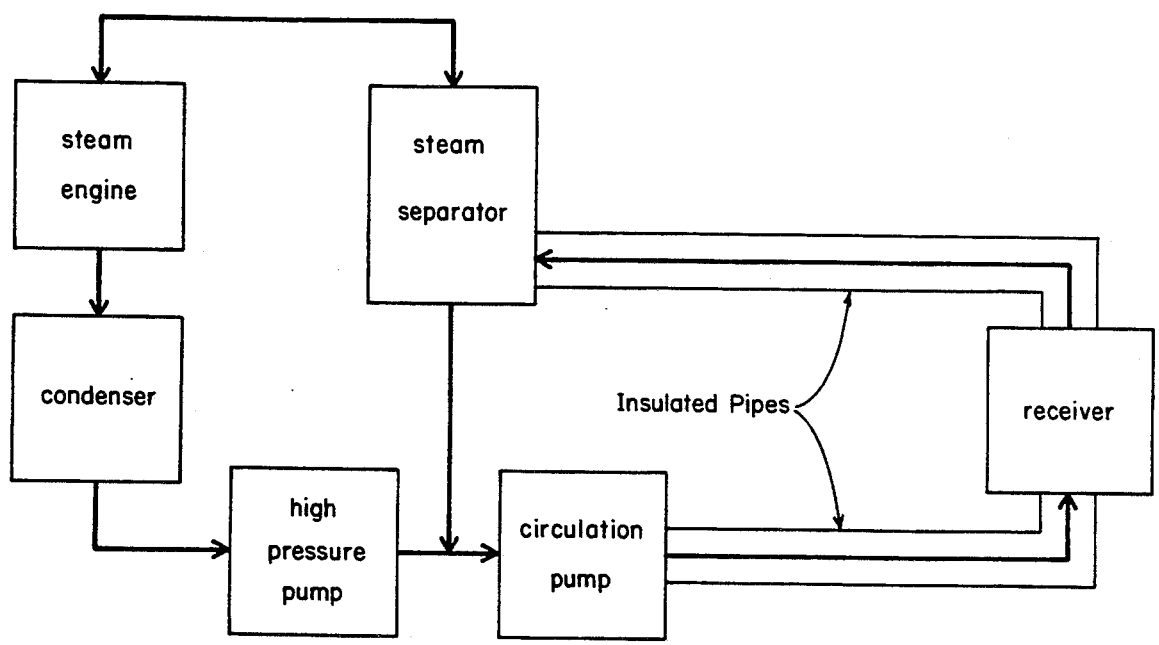
Figure 26:
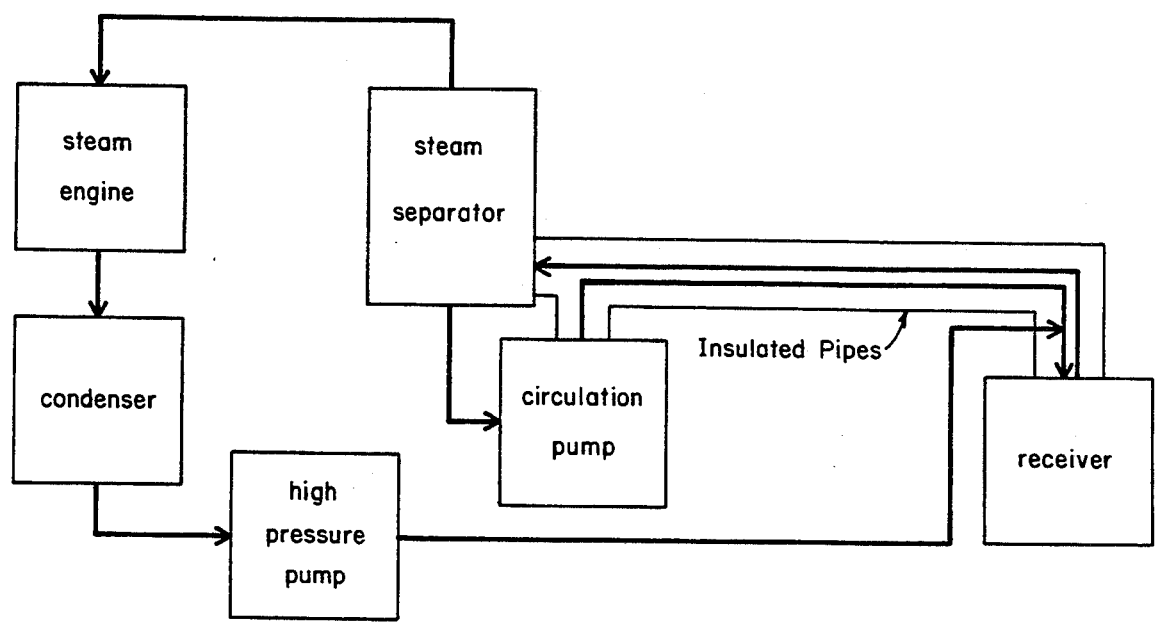
Figure 27:
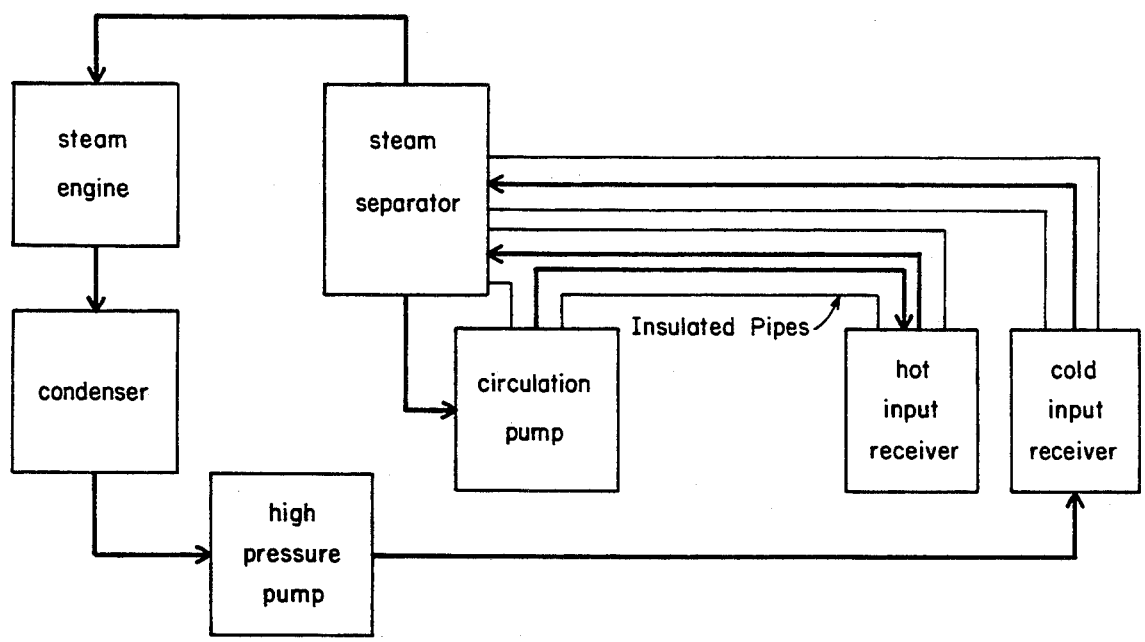

FIGS. 5a, b, c, and d are illustrations of the cradle as taught by the present invention;

FIG. 6 is a side view of the cradle as it would be mounted in operation;

FIG. 7 is a polar axis end view of the cradle shown in FIG. 6, showing how the polar ends of an array of concentrator dishes/cradles would be braced by guy wires;

FIG. 8 shows a known internal receiver;

FIG. 9 is a cross section of an internal receiver as taught by the present invention;

FIG. 10A and 10B illustrates possible ray traces in the receiver shown in FIG. 9;

FIG. 11 is a detail drawing of the receiver shown in FIG. 9;

FIGS. 12A and 12B illustrate cross-sections of an internal receiver with a single centered steam pick up tube;

FIGS. 13A and 13B illustrate cross-sections of an internal receiver with a single steam pick up tube at the edge of the receiver's fluid chamber;

FIGS. 14A and 14B are cross-sections of an internal receiver showing multiple steam pick up tubes as taught by the present invention;

FIG. 15 illustrates how the present invention's receiver is mounted atop the concentrator dish;

FIGS. 16A and 16B illustrate views of a known rope drive;

FIGS. 17A and 17B and 17C show views of an improved rope drive as taught by the present invention;

FIGS. 18A and 18B show views of another improved rope drive as taught by the present invention;

FIG. 19 illustrates how the present invention's polar axis drive is mounted;

FIG. 20 illustrates how the present invention's declination axis drive is mounted;

FIGS. 21A and 21B illustrate views of the placement of the solar tracker's sensors as taught by the present invention;

FIG. 22 is a block diagram of the solar tracker's circuitry as taught by the present invention;

FIG. 23 is a second block diagram of the solar tracker's circuitry as taught by the present invention;

FIG. 24 is a wiring diagram for the polar and declination axis drive motors as taught by the present invention;

FIG. 25 is a diagram of a plumbing system in a known solar collector;

FIG. 26 is a diagram illustrating an improved plumbing system as taught by the present invention;

FIG. 27 is another diagram illustrating a further improved plumbing system as taught by the present invention; and FIGS. 28A and 28B show views of details of the plumbing system as taught by the present invention.

DETAILED DESCRIPTION OF THE PREFERRED EMBODIMENTS

The present invention, in its first preferred embodiment, comprises an optimized dish concentrator with mirror, a cradle which supports the concentrator/mirror and allows it to move to track the sun, an internal receiver for transferring the concentrated solar energy provided by the concentrator mirror to the working fluid, a solar tracker and drive system which keeps the concentrator properly aligned with the sun, and improved fluid couplings which allow the system to be coupled to the load. These elements will now be described sequentially and in detail. In this description, the load may comprise a turbine or other heat engine, a heat exchanger, an industrial process requiring high temperature, or the like. Nothing herein should be taken to limit the application of the present invention to any one particular load, although this description only discusses the load as a steam turbine for electricity generation.

The Concentrator Dish

Many known solar energy steam generators use a paraboloid dish in a distributed receiver system. In the present invention, the concentrator dish has this paraboloid shape. Various types of mirrored surfaces have been used with these dishes. In the present invention, a fiberglass backed plastic mirror has been used. The mirror is a multi-layer system. A plastic layer is coated with a very thin layer of metal. The plastic is commonly a polyester, although other materials can be used. The metal used is either aluminum or silver. Silver has a higher reflectivity but a shorter practical lifespan. Typically the plastic contains an ultraviolet absorber to protect the metal layer. A second layer of plastic protects the back of the metal coated plastic and a glue is used to attach the mirror to the dish. This type of mirror and mirror construction is known.

Although not nearly as strong as steel, cost considerations require that the dish be made mostly from fiberglass. As fiberglass alone is not strong enough to survive high wind loadings, a simple rigid bracing is required. As the entire dish must move to track the sun, the bracing must extend only a minimum distance behind the mirror structure. Placing the bracing structure in front of the dish and mirror would be preferable for mechanical engineering reasons. However, bracing in front of the dish and mirror would block sunlight, making it more cost effective to place a more expensive bracing structure behind the dish.

Figure 1A:
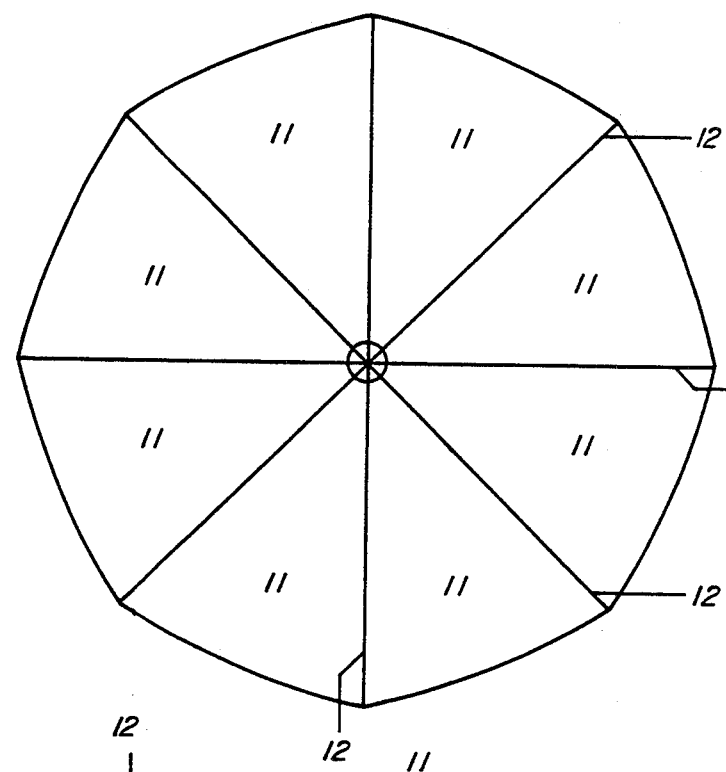

In this embodiment of the present invention, as shown in FIGS. 1a, b and c, dish 10 is a thin paraboloid fiberglass shell comprised of eight sections 11 nested in a steel structure comprising a teepee shaped steel frame 15 extending a considerable distance behind the dish and eight radial ribs 12 extending between dish segments 11. The number of dish sections 11 and ribs 12 will vary depending upon the size of dish 10. Each rib 12 is connected to one leg of teepee frame 15. There is a central brace 18 in the center axis of the dish with a diagonal brace 19 extending from the central brace to each rib. Diagonal braces 19 lie in the surface of a cone and attach to the ribs at a point about 80% of the dish radius from the center of the dish. The bracing structure extends behind the plane defined by the edge of the dish a distance of roughly 90% of the dish's radius.

In the illustrated dish, the fiberglass can be quite thin. If dish sections 11 are no more than 1.5 m wide at the outside of the dish, which is the width of available mirror material, then the fiberglass thickness can be 1.5 mm, permitting operation in a 15 m/s wind and survival in a 50 m/s wind. At that thickness, the fiberglass in an 20 section dish with a nominal 10 mm diameter would weigh 1,500N.

The mounting of the concentrator dish in a cradle is described in detail below. The dish is held in a gimbal and has a pair of mounts that are diametrically opposed on the declination axis of the dish. The dish can rotate around the declination axis, located in or near the plane of the lip of the dish. A declination drive track 21 is coupled to the apex of the teepee frame. Drive forces to overcome wind loads are minimized by the long lever arm connecting the drive to the dish.

Figure 2:
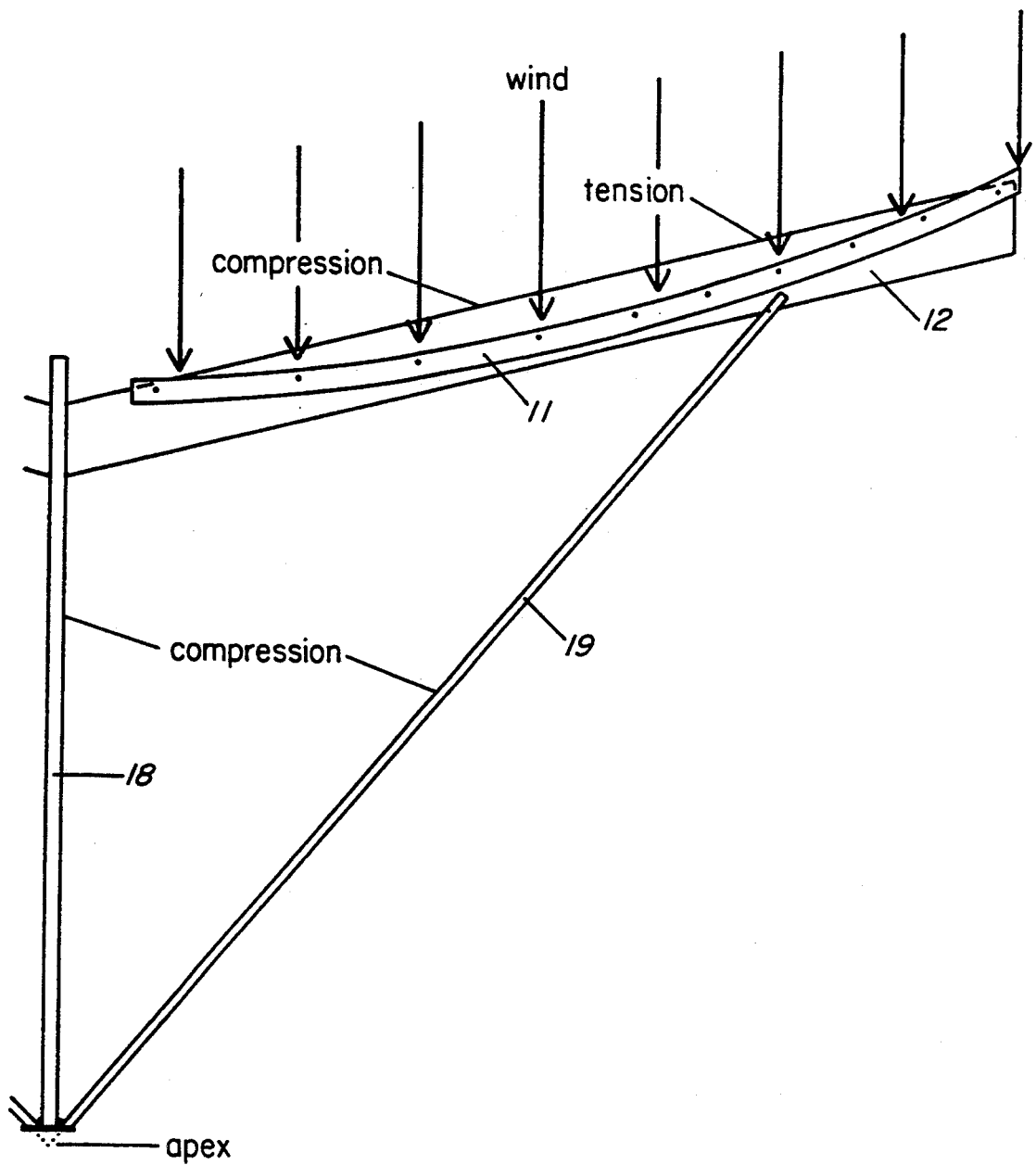
FIG. 2 is a cross section of the concentrator dish shown in FIG. 1, illustrating details of its internal and external bracing.
Figure 3:
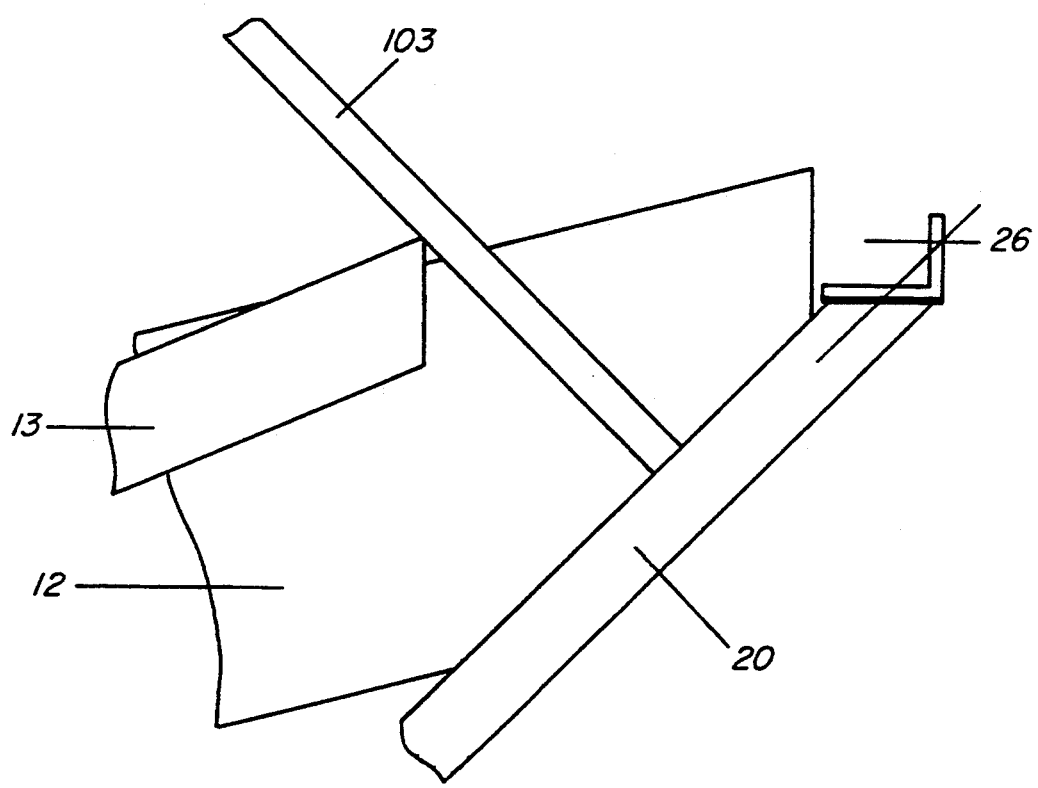
FIG. 3 is another detail drawing of the dish shown in FIG. 1, illustrating how the dish segments are clamped together.

As shown in FIG. 2, steel ribs 12 are a length equal to the dish radius, a height of roughly ¼ the dish depth, which allows the ribs to be held between dish sections for their entire length, and a thickness which prevents buckling. Dish ribs 12 are relatively thin metal strips. Buckling of the ribs is resisted by the clamping of the mirror sections 11. This clamping is illustrated in FIG. 3. Segments 11 have flanges 13 running along their radial edges. Ribs 12 are placed between sections 11 and clamped together with neighboring flanges 13. Bolt 14 holds the assembly together.

Braces 19 (FIG. 2) will typically be formed of metal tubes. As the basic element of a stable two-dimensional structure is a triangle, the basic dish structure will be a group of triangles built rotationally symmetric around the axis of the dish. Pole 18 in the dish axis forms a common edge for all the triangles. Each rib and its brace form the other two edges of each triangle. Each tube must be large enough to avoid failure in the column buckling mode, but the methods for calculating such buckling stresses are well known.

Figure 4:
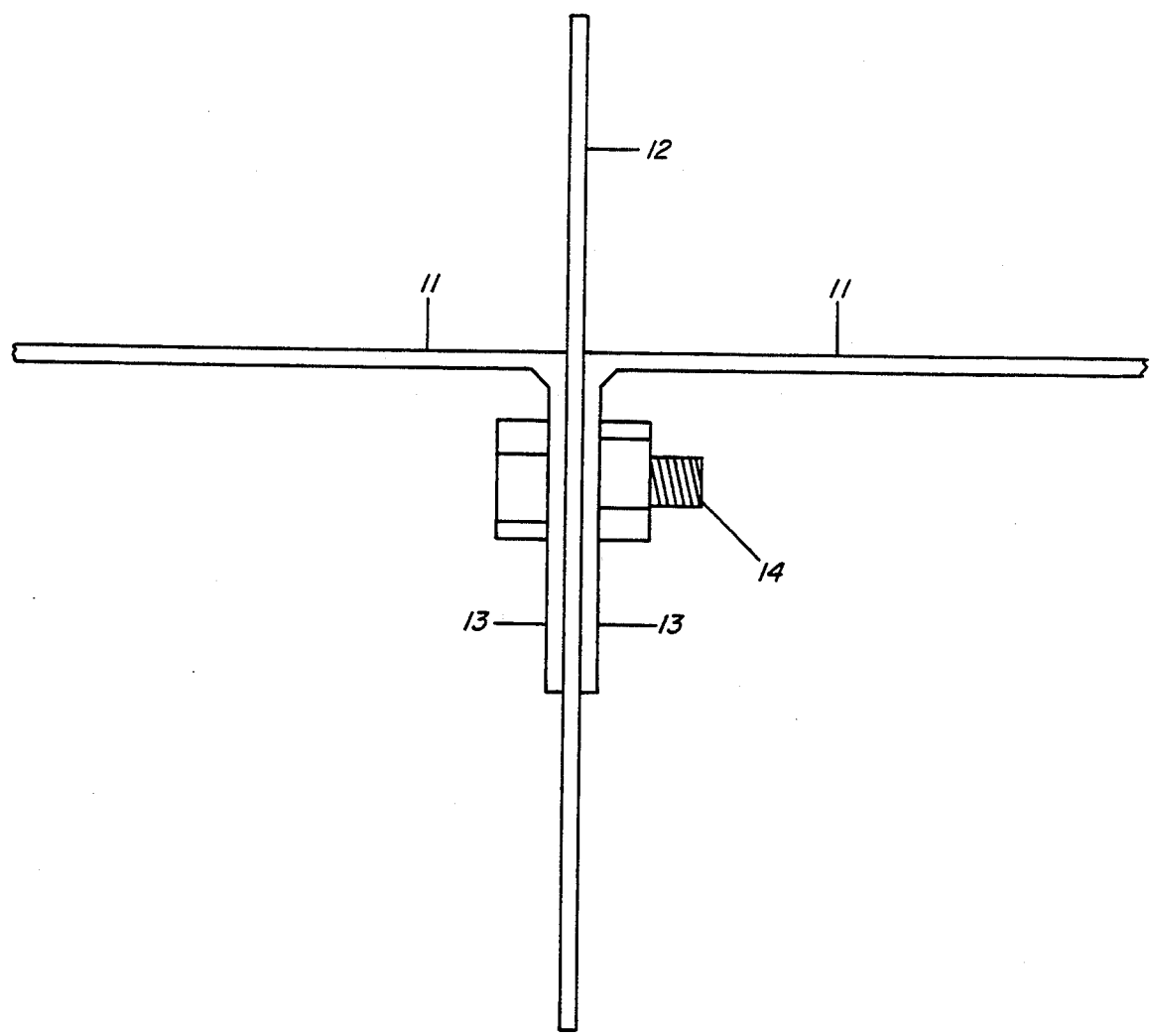
FIG. 4 is another detail drawing of the dish's construction.

There is a radius at which rib braces 19 should be attached to ribs 12 to minimize the stresses in the ribs. The optimum position of the attachment depends on the number of mirror sections and the form of the outside edge of the dish. In general, the attachment point will be between 75 and 85% of the dish's radius. The exception to this is illustrated in FIG. 4, which illustrates how a dish brace 20 is coupled to the dish mount at declination drive track 21. Dish brace 20 and the lower end of receiver mounting tube 103 stabilize the end of dish rib 12 so that the declination axis bearing 26 can be moved further from the edge of the dish. In this instance, the attachment of brace 20 to rib 12 occurs at the dish's radius.

At the midpoint of the rib, the lateral support from the fiberglass dish is near the center of the rib. The metal ribs provide most of the support for the mirror segments. Flanges 13 are only stiff enough to keep the mirror segment from flexing excessively between the mounting bolts. It is the mirror support, including pole 18 and braces 19, not the flange, that prevents the rib from buckling. There is no force on the dish that would tend to twist the dish braces around the axis of the dish. There is therefore no need for a strong brace between the ends of the ribs.

The Cradle

Most known two-axes solar concentrator dishes are mounted on a monopod. This structure has the disadvantage that it needs a massive concrete base and the monopod itself interferes with the optimum dish bracing structure. The dish/mount combination is consequently not as strong as desirable and so the dish must be driven to a stow position to survive high winds. In such a system there is no easy way to attach a simple drive system and there are large wind induced torques on the drive system.

The present invention comprises a cradle for the concentrator dish that is strong enough to survive high winds without the concentrator dish being driven to a special stow position. The axes of rotation of the dish using the cradle described herein pass through or near the plane described by the edge of the dish to reduce the wind induced torques on the drive system. Large radius tracks can be attached to both the dish and cradle so that the gear train and the drive motors can be simple and inexpensive.

The cradle is a light weight structure which has fewer structural members than other dish mounts designed to replace monopod mountings. The cradle moves around an axis parallel to the earth's axis of rotation. This type of mounting cradle is known as an equatorial or polar axis mount. The polar axis mount makes the drive simpler and cheaper than an altitude/azimuth mount. The cradle of the present invention leaves an open space behind the dish of about 1 dish radius in which dish bracing can be placed without interfering with the dish's motion.

Figure 5B:
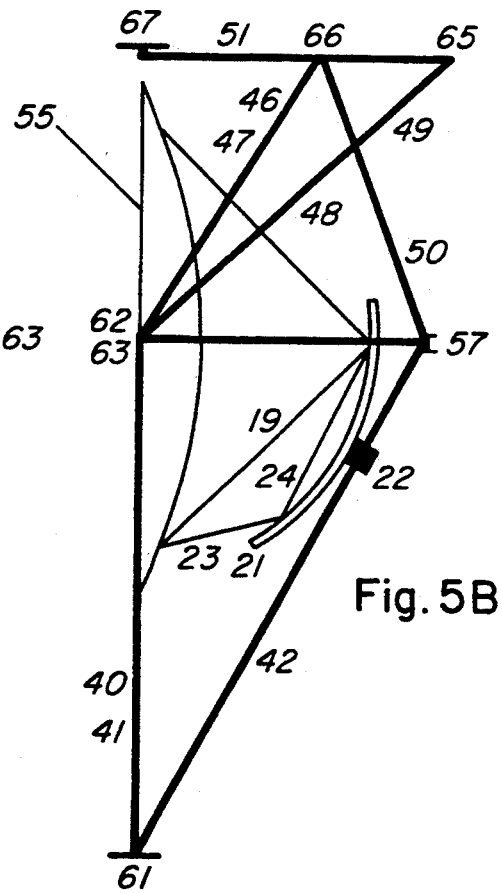

The dish is mounted in the cradle structure and can be rotated within the cradle around the declination axis. The entire dish and cradle structure is rotated around the polar axis. There are a total of 12 structural members, numbered 40 through 51, in the cradle, one of which can be eliminated if the dish is properly designed. A set of orthogonal views of the cradle is shown in FIGS. 5a, b, c, and d. Certain requirements apply to the design and construction of the cradle and the cradle mount. All forces along polar axis 55 must be delivered to the earth at equatorial end 61 of the mount. Structural member 51 in FIG. 5b must lie perpendicular to polar axis 55. The polar end mount 71 for the cradle is a guyed monopod or bipod (FIG. 6) which lies in a single plane perpendicular to polar axis 55. If member 51 and polar end mount 71 are kept perpendicular to polar axis 55, there are no resultant polar axis forces at point 67 from declination or solar axis forces on the cradle. This allows the structural members of the cradle, especially member 51, to be lighter than would otherwise be possible. The remainder of the cradle is based on a trio of tetrahedrons, fundamentally stable, three-dimensional structures, arranged so that the dish can be moved through its required range of motion.

The cradle comprises three tetrahedrons. At the equatorial end is the tetrahedron with apices labeled 61, 62, 63 and 64 in FIGS. 5a and b. Polar axis 55 passes through points 61 and 67. The declination axis passes through points 62 and 63. These two axes are co-planar, or nearly so, and are also in or very near to the plane formed by the edge of the dish when the dish's declination is zero. The exact dimensions of the cradle depend on the dish design and the intended latitude of the installation. The distance from the declination axis 45 to point 61 will normally be about 2 dish radii and the distance from 62 to 63 is about 2.2 dish radii. The dish must be able to rotate between members 40 and 41. With the indicated dimensions, a round dish will not clear the cradle. Trimming the edge of the dish is preferable to designing the mount to accommodate a round dish.

The second tetrahedron has a base with apices 62, 63, and 64, with a fourth apex 66. Apex 66 must be far enough below polar axis 55 so that the dish can be moved to its summer position without hitting members 46 and 47. Normally point 67 will be 1.1 dish radii from declination axis 45, so that point 67 will not shade the dish in sum men For a dish with an optical speed of f 0.5, which is a desirable value, apex 66 should be about 0.75 dish radii below the polar axis.

The third tetrahedron has a base 62, 63, and 66 with a fourth apex 65. The total weight of the cradle is minimized if apex 65 is located about 1.25 dish radii below polar axis 55. The cradle weight does not increase rapidly if apex 65 is moved from its optimum position.

Member 51 is the only piece of the cradle that is loaded in flexure. There are no forces at point 67 along polar axis 55, so member 51 needs no particular strength in that direction. Forces in the solar direction do not flex member 51, so they can be ignored. The largest wind loading along the declination axis occurs when the sun is at an equinox and when the cradle is rotated 45° from its noontime position. In this position, the wind induced moment at point 66 is less than 25% of that which could be experienced by a monopod holding the dish. In addition, this moment can occur around only one axis, whereas a monopod holding a dish can experience the moment in any direction.

The design of the cradle requires a stress analysis of each member. These stresses are easily calculated using known free body analysis techniques. In most members, it is only necessary to avoid column buckling. The exception is member 51. In no case is there linear stress on member 51 between points 65 and 66. There is a linear stress between points 66 and 67, but the linear stress is much less than the stress caused by the moment around point 66. If member 51 survives the moment around point 66, it will easily avoid buckling due to compression caused by the wind directly into the back of the dish. The wind load in each direction depends on the relative position of the dish, cradle, and wind. Solar azimuth and elevation can be calculated from the date and time using known formulas. From that information, wind loading along the three axes of the cradle (polar axis 55, declination axis 45 and solar axis 57) can be calculated. For ease of calculation, the weight of the dish can be assumed to be 10% of the maximum wind load. This results in a downward force at points 62 and 63 of 5% of the maximum wind force. The cradle itself weighs as much as the dish, which weight must be considered. This can be done by assuming that ¼ of the weight of the cradle (2.5% of the maximum wind force) appears as a downward load on each of points 62 and 63. Using known analytical techniques, the required size of each member of the cradle can be determined by calculating the greatest load that it will sustain.

As an example only, an economically optimized dish diameter for use with this cradle mount could be 10 m. For such a dish, the total weight of the cradle would be under 7500N if it were to survive a 40 m/s wind. This is just under 10% of the maximum force exerted by such a wind. This cradle will survive high winds independent of the relative positions of the dish and wind direction. With the space the present invention provides for dish bracing, it is cheaper to build the dish strong than it is to build the high speed drive that would be needed to drive the dish quickly to a special stowed position.

At latitudes more than 20° away from the equator, the mount for point 52 is a concrete pad or low pier as shown in FIG. 6. Polar end mount 71 is required for the described cradle and can use a guyed pole 72 with the guy wires 75 and pole all lying in a plane perpendicular to the polar axis. It is also possible to use a bipod or guyed bipod. The guy wires can be anchored to the concrete pads of adjacent cradles to the east and west. This is illustrated in FIG. 7.

Figure 5C:
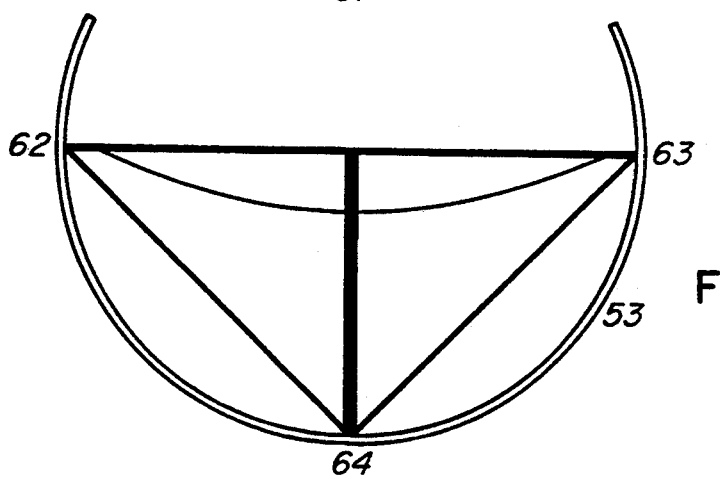

A cradle drive track 53 (FIG. 5c) is attached to points 62, 63 and 64. Track 53 must be concentric with polar axis 55 which means the three points must be equidistant from the polar axis. The polar and declination axes do not need to be coplanar, but this simplifies the cradle and its installation. Polar drive motor 77 (FIG. 6) is mounted close to the ground on a pad or short pole. Declination drive motor 22 is mounted on cradle 35 on member 42 of the cradle to drive track 21 mounted on the dish concentrically to declination axis 45. With this dish mount, uniform wind causes no torque on the drive system. Unfortunately, the wind is rarely uniform. It increases with increasing altitude and it imposes various torques on the drive. For a 10 m dish located on the equator, the wind gradient can produce a torque of 23000 Nm around the polar axis. As latitude increases this torque decreases with the cosine of the latitude. At all times, the torques experienced around the declination axis are considerably smaller. For example, at 35° latitude, the maximum torque around the declination axis is about 6000 Nm.

Figure 1B:
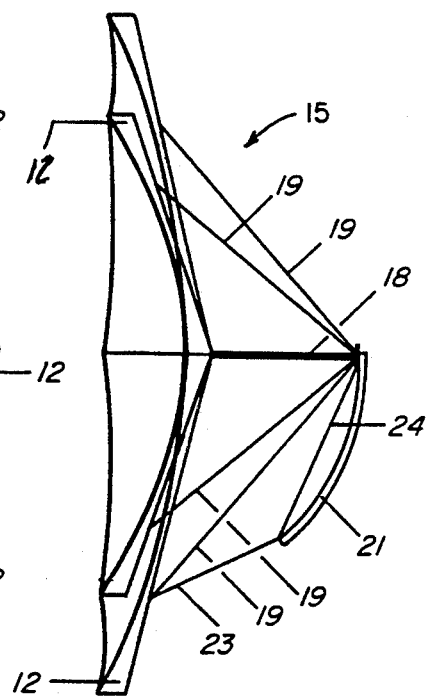
Figure 1C:
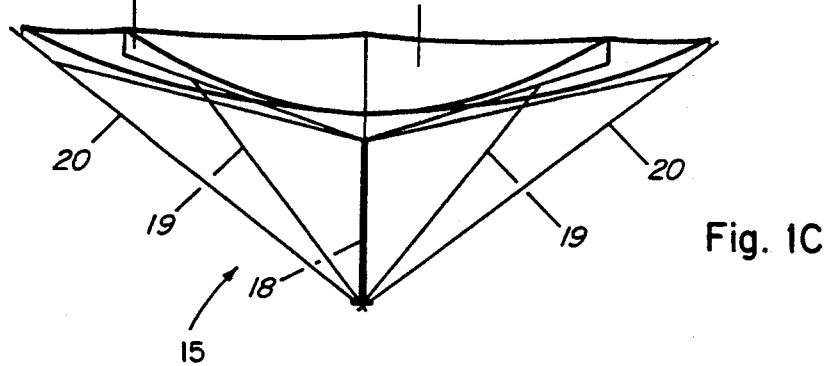

If a wind blows directly into the face of the dish, member 45 will be in tension. If the dish structure is as shown in FIGS. 1, the diagonal braces of the dish behind the declination axis will be in tension. With proper dish design, the horizontal component of the tension in the dish braces will be about equal to the tension calculated for the cradle member 45, leaving member 45 unstressed and therefore unneeded. Any residual force between points 62 and 63 can be transmitted through the dish itself. Thus, if thrust bearings are used for mounting the dish at points 62 and 63, there does not need to be a cradle member between points 62 and 63 and the dish does not need to be designed to withstand a large force between the mounting points.

The Receiver

A solar energy receiver can be as simple as a thick walled can with tubes attached for water input and steam output. The present invention utilizes an improved internal receiver, the improvements comprising an optimized cavity shape, a combined convection baffle/thermal shield/secondary reflector, and improved fluid circulation.

Optimized Cavity

FIG. 8 illustrates a known internal receiver 80. Outer wall 81 is heavily insulated by insulation 82 to reduce heat loss. As most heat loss occurs through aperture 83, the size of aperture 83 is minimized. The working fluid, herein water, is injected from water pipe 85 into cavity 84, where the concentrated solar energy heats and brings it to a boil. Steam tube 86 then carries the superheated water and steam away to the load. A weather shield 88 surrounds the receiver, protecting it from the elements. Although this receiver functions adequately, it can be significantly improved at only slightly increased cost.

There are several conflicting requirements that must be resolved to achieve an optimized internal receiver design. The receiver's cavity should appear as black as possible as seen from the dish, which implies that the internal cone which comprises the walls of the cavity should be very deep. However, the volume of the cavity should be minimized to reduce thermal losses. The small volume implies a short cavity with a small radius aperture. The small radius would normally result in a very high power density of absorbed sunlight on the walls of the cavity but there is a physical limit to the maximum solar power density that the cavity walls can tolerate. For any given cavity, the thermal losses can be reduced by adding an aperture that blocks part of the opening to the cavity. Adding the aperture also reduces the total solar power that reaches the cavity, so an optimum aperture size requires balancing these various constraints. Finally, the aperture size is a function of the focal ratio of the dish, which can also be optimized.

For any given cavity depth, there is a cavity shape that maximizes the blackness of the cavity. Referring to conical cavity 87 shown in FIG. 8, any ray will be reflected out of the cavity after some small number of reflections. Rays from the edge of the dish will be rejected after the fewest reflections. This is unfortunate because the highest energy density in the cavity occurs at the points which receive the image from the edge of the dish. The situation can be improved by making the cavity cylindrical over the region where the intercepted power density is high, then conical further inside. More gradations in the slope of the cavity wall would improve the cavity's performance still more. Ultimately, the cavity wall can be made with a continuous curve to yield the shortest and blackest possible cavity.

This is the preferred configuration shown in FIG. 9. Walls 91 of receiver 90 are insulated by a layer of insulation 92, which is in turn surrounded by weather shield 98. Optimized internal receiver 90 comprises an optimized cavity 97 having a continuous curve. The curve for the cavity is designed to guarantee some minimum number of reflections for each ray before it leaves the cavity. If the cavity has a specular surface that is 90% black and if the cavity is shaped to insure at least three reflections before a ray can exit from the aperture, then 99.9% of the incident solar energy will be absorbed by the cavity.

The shape of the cavity is computed sequentially. The radius of the cavity at the level of the aperture is calculated from energy density considerations. A sample ray trace is shown in FIG. 10 for a ray that undergoes a minimum of 3 reflections before it escapes from the cavity. The ray enters the cavity, barely avoiding being vignetted by the aperture, which has a radius $R_a$. $\beta$ is the angle above the horizontal at which the ray enters cavity 97. It hits the wall of cavity 97 at height H above the aperture plane. At that point the cavity has a radius $R_c$. Here, $$\beta = \arctan(H/(R_c + R_a)).$$

A normal to the wall is drawn from the point where the ray hits to the aperture plane. The normal is at an angle $\alpha$ above the aperture plane. For $N \leq 3$, $\alpha = \beta/(N-1)$.

If the approximation is made that $\alpha$ at height H is the same as $\alpha$ at height H', then the previous equation is true for any N. The length of the normal line is $L = H/\sin \alpha$. To compute the radius $R^+$ of the cavity at a height $H + \Delta H$, the normal is rotated around the point where it hits the aperture plane so that $$R^+ = R_c - L*[\cos(\alpha - \cos(\alpha + \Delta H/(L*\cos \alpha))].$$

The approximation can be made arbitrarily accurate by choosing a small enough $\Delta H$, which makes errors in R inconsequential.

At high power densities, boiling occurs in the water, steam bubbles leave the surface, and heat transfer is very efficient. At higher power densities, boiling becomes so violent that a steam layer is formed on the surface, water is largely kept off the surface, and heat transfer becomes very inefficient. At one atmosphere pressure, power densities must be limited to about 125 W/cm$^2$, even under ideal conditions. As startup pressure in a solar energy system is at one atmosphere pressure, the power density should be kept within this limit. Given that the solar image is not perfect and that there are hot and cold spots, the average power density should be held to 50–60 W/cm$^2$.

On a bright, sunny day, solar power density is 0.1 W/cm$^2$. A maximum power density of 60 W/cm$^2$ on cavity wall 97 of receiver 90 requires a concentration ratio 600 or less. If the dish were optically perfect, the radius of the receiver cavity would have to be at least:

$$R_c = R_d * \cos \phi / \sqrt{600} \sim 0.035 * R_d,$$

where $R_d$ is the dish radius and $\phi$ is angle of incidence of the collected ray to the surface of the receiver (typically about 30°). The dish is not optically perfect, so to prevent damage to the receiver at hot spots in the solar image, the cavity radius must be made larger than the above value. The safety factor needed to accommodate the hot spots in the solar image depends on the details of the dish design, but in most cases a factor of 1.2 will suffice. Cavity 97's radius should therefore be about 0.042 times the dish radius.

Thermal considerations give a lower limit for the radius of receiver cavity 97. In general, this is larger than the radius of the solar image that must enter the receiver. Thermal losses from the cavity can be reduced by adding an aperture 93 that blocks part of the receiver opening. This is commonly done in existing systems. The optimum aperture radius can be determined only by a detailed computer analysis including models of the quality of the mirror surface and the expected wind induced flexure of the mirror. With the dish construction described above, the optimum aperture radius is 0.032 to 0.035 of the dish radius, 60% to 70% of the area of the mouth of the receiver cavity.

Convection Baffle/Thermal Shield/Secondary Reflector

Convected heat loss from the cavity can be further reduced by putting a shield 101 around the aperture which will interfere with convection currents. Of course this shield should not interfere with incoming light rays. As shown in FIG. 11, a significant volume under the receiver exists where a structure can be placed which will not block rays traveling between the sun and the mirror and between the mirror and the cavity. Placing a conic section 101 of any solid material here as shown will interfere with convection currents and reduce convection losses.

One of the problems of known internal receivers is that if solar tracking is lost, the solar image is scanned across the outside of the receiver housing. When tracking is reestablished, the solar image is again scanned across the outside of the housing. This process can easily burn holes in the housing or cut it completely in half. Known solutions to this problem include building a drive system that can move the dish very quickly, adding extra material to the receiver housing so that it can withstand the brief periods when it receives the solar energy and adding a gravity or spring driven mechanism to the dish to force it away from the solar track if power to the normal drive system is lost. The only purpose of these extra measures is to prevent damage to the receiver housing when solar tracking is lost. They add considerably to the cost of the system.

A paraboloid generates a good image only when it is exactly on axis. When the solar image is moved to the edge of the aperture, aberrations already reduce the power density to about 150 W/cm², even if the dish is perfect. This is equivalent to a black body surface temperature of about 2200° K. The emissivity of the surface does not affect the steady state temperature. As this temperature exceeds that which metals can survive in air, a ceramic heat shield may appear necessary. However, if the back side of the receiver's shield 101 is blackened to radiate energy while the front side is made reflective, a steady state temperature of 1500° K. can be attained. Many common metals can tolerate this temperature in air for a brief period of time, allowing the same structure to serve as both the convection baffle and the heat shield.

Optimizing the size of aperture 93 is a tradeoff between intercepting all possible sunlight from the optically imperfect solar image while losing the minimum possible energy by radiation and convection from the cavity. Some solar energy is always lost at the edges of the aperture. If the convection baffle/heat shield is polished on its inside surface, some of the energy that would otherwise be lost at the edges of the aperture can be reflected into the receiver's cavity.

As this secondary reflector is also the heat shield, it can get very hot and should therefore be made from a highly reflective material that can tolerate high temperatures such as platinum. Given the cost of platinum, a thin layer of it would be plated onto a less expensive base material. Using a secondary reflector increases system efficiency by about 0.4%. Thus if plating convection baffle/heat shield 101 to make it a secondary reflector also costs less than 0.4% of the total cost of the system, then the plating is economically advantageous.

Improved Fluid Circulation

Figure 12:
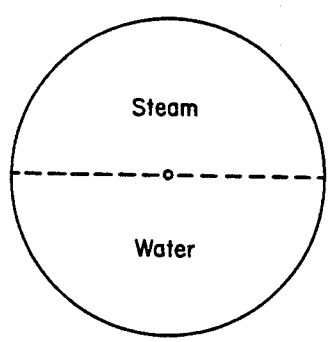
Figure 12:
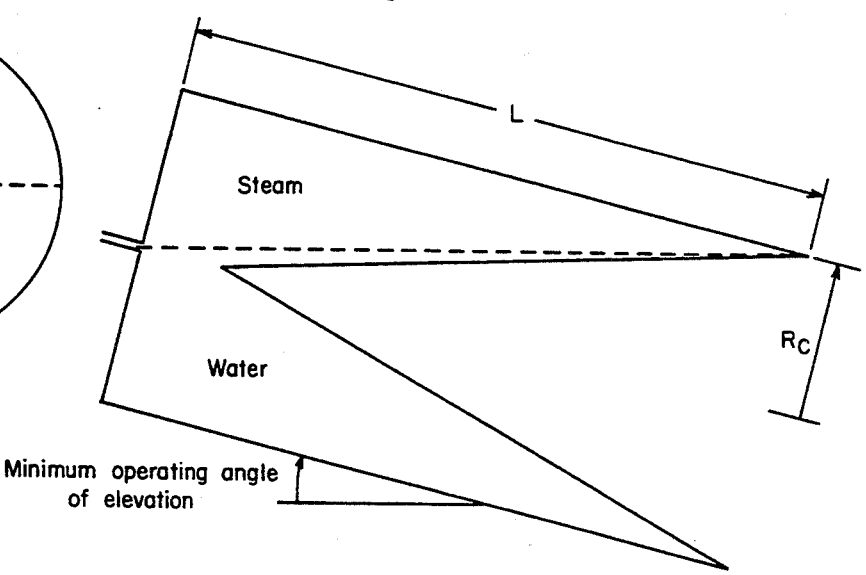

At the end of each day, the axis of the boiler approaches horizontal. If the steam pickup tube in the receiver is placed at the center of the boiler as shown in FIG. 12, nearly half of the boiler will be filled with steam, not liquid water. The steam bubble must not be allowed to be in contact with the inside wall of the cavity while the cavity is illuminated. The high side of the cavity is illuminated by the low side of the dish. The cavity wall must therefore be kept wet until the sun is low enough to put the dish into significant shadows from adjacent dishes or until the received solar energy falls below a certain maximum value, if there are no adjacent dishes. At 35° latitude, the bottom of the dish may not be shaded at all until the sun is within 0.1 radian ('r') of the horizon. That requires that the boiler length must be at least 10 times as long as the radius of the cavity, which is longer than desirable.

If the steam pickup tubes are mounted near the point on the boiler that is highest at noon, the problem is reduced. When the dish points at the horizon, the pickup tube is then above the axis by a distance of $H = R_t * \cos(\text{latitude})$, where $R_t$ is the radius at the point where the tube enters the boiler, as shown in FIG. 13. The length of the boiler must therefore be $L = 10 * (R-H)$, where R is the radius of the cavity.

It is entirely possible to mount a pair of steam pickup tubes that are joined near the apex of the receiver mount tripod. With this installation, shown in FIG. 14, the boiler can be made a minimum convenient size. L in the previous equations is not the boiler length but rather the distance from the aperture to the joint in the tubes. $R_t$ is the radius to the joint in the tubes. L can be made any desired length without affecting the boiler design, but $R_t$ must be limited as it is undesirable to shade the dish and unacceptable to shade the solar tracker (see below). As a practical matter, $R_t$ is limited to something less than the radius of the weather shield over the boiler.

As shown in FIG. 15, the receiver is mounted to the collector dish using a tripod of steel tubes 103 with a 2.5 cm outer diameter and a 1.25 mm thick wall. These tube sizes depend on the size of the dish. In the northern hemisphere, the legs are mounted to dish ribs 12 on the east, west, and south s des of the dish. This mounting delivers no net force to the sides of the dish and the force at the south end of the dish is transmitted to declination drive 22 with a minimum effect on total rib stress.

The upper ends of receiver mounting tubes 103 are welded together and a receiver mounting plate 105 is welded into the tripod just below its apex.

The boiler has three threaded rods 107 welded into it. Screws with a root diameter of 1.2 mm are adequate. The actual size of the mounting hardware will ultimately depend on the dish's diameter and the receiver's size. The rod material is stainless steel for low thermal conductivity and the rods extend through insulation material 92 and weather shield 98. Weather shield 98 is held in place between three pairs of nuts so that it is held in a coaxial position relative to the boiler cavity. Convection baffle 101 is then attached with sheet metal screws. The assembly is then connected to the mounting plate on the tripod with another three pairs of nuts so that the aperture is on axis with the dish. Precise alignment is not critical. Fluid input line 95 and fluid output line 96 are welded and insulated with pipe insulation 99 after the receiver assembly is mounted on the tripod.

Dish Drive

One simple and inexpensive method of moving a load over a distance of some meters is to connect the load to a rope, attach the rope to the drive shaft of a motor and then turn the drive shaft. The potential low cost of such a system is very important in driving a solar collector, where low cost is essential, extreme precision is unnecessary and a total lifetime of 10,000 cycles represents 30 years of service. Unfortunately, known rope drives have several major shortcomings. For purposes of this description, rope is considered to include flexible steel cable.

In known rope drives, the rope rubs on itself, limiting its lifespan. Tension in the rope must be kept high, even when there is no load, to prevent slippage under high loads, which further reduces lifespan. There is no convenient way to maintain tension in the rope and the rope tends to travel axially along the drive shaft when the shaft is turned. As the drive wheel will turn many times per day, the axial movement is significant. If the drive wheel is grooved to hold the rope in place, the rope is forced to rub against itself even harder, further increasing the wear on the rope. No known commercial solar energy generation system uses a rope drive for these reasons.

The problem of the rope rubbing against itself can be eliminated by using two drive wheels in the drive. Both can be driven, but this adds to the system's complexity unnecessarily. A drive wheel and an idler are sufficient. If the cable is wrapped through the drive mechanism more than three or four times, the friction in the cable is sufficient to prevent slippage in the drive. Adding a third spring-loaded wheel provides the needed no-load cable tension and controls backlash under changing wind conditions. This is shown in FIG. 16. Drive wheel 111 is connected to a motor. Wheel 113 maintains sufficient tension in the rope. Wheel 115 is an idler. This system has a drawback that the rope going into the drive is not colinear with the rope leaving the drive.

Adding another pair of idler wheels can result in a drive where the input and output cables are co-linear. This is shown in FIG. 17. The added idler wheels 114 are located so that the input and output rope sections are colinear.

FIG. 18 illustrates a rope drive with nearly co-linear input and output and a tensioning wheel that can adjust to a greater range of slack in the drive with fewer drive components. It comprises a first drive wheel 111 and three idler wheels 113, 115, and 117. Wheel 113 controls the rope tension, wheel 115 idles, and wheel 117 maintains the ropes in their nearly co-linear input and output position.

The gear train output must be able to withstand the torques applied by the maximum wind load. Cable tension from a 10M dish mounted in a cradle as described above in a 40 m/s wind can be 3,400N. Inexpensive steel cable 5 mm in diameter can handle that tension and wrap around a wheel with a 2.5 cm radius. Given this size wheel, the peak torque on the drive will be nearly 85 Nm.

The collector dish of the present invention must be driven to follow the apparent daily and seasonal motion of the sun. The cradle for the concentrator dish is mounted on a polar axis, so normal drive motion is a constant speed around that axis once per day, or 73 $\mu$r/sec. As shown in FIG. 19, the ends of the rope are coupled to the ends of channel 53. Drive 77 is coupled to the ends of the rope and the activation of the drive moves the dish around the polar axis. Similarly, the ends of a rope are coupled to the ends of drive track 21 (FIG. 22) and drive 22 moves the dish around the declination axis when the drive is activated. Peak wind induced torque is about 20,000 Nm on a 10 m dish. Under these conditions, the dish's polar drive must generate about 1.5 W in a 40 m/s wind. Even if the dish must be driven at twice that speed to correct for tracking errors, total drive power needed is only 3 W, allowing a very small motor to fill the role.

The motors driving both axes must be reversible. Normal DC motors, with their commutators and brushes, have a short operating lifetime. AC shaded pole induction motors are not reversible. Capacitor run induction motors and capacitor run synchronous motors, either permanent magnet or hysteresis type, are reversible by switching the winding to which the capacitor is connected and are acceptable in the present invention.

Several approaches are possible for motor speed control. The motor could be turned on long enough for the dish to be in advance of the sun's apparent motion and then the motor could be turned off until the sun "catches up". This would be particularly acceptable for the declination drive, which theoretically only needs to be adjusted occasionally. A continuously variable motor speed controller could maintain nearly perfect solar tracking, but would be extremely expensive and difficult with AC motors.

The present invention uses a pair of AC sources. A 30 Hz and a 60 Hz AC source could be used. With appropriate gearing, the dish will nominally track the sun when the motor is running at 30 Hz. Any errors could be corrected by either coupling the motor to the 60 Hz source until the dish catches up with the sun, or stopping the motor until the sun catches up with the dish. This minimizes the time that the solar image is not centered on the receiver's aperture. The voltage at which the motor is operated must be proportional to the operating frequency. For example, if the motor is rated for 120 V, 60 Hz, then the AC sources should be 120 V, 60

Hz and 60 V, 30 Hz. To return overnight to the dawn position, the drive motor is run in reverse at the higher frequency.

As two AC power sources are needed for each motor, and there is commonly an entire field of motors in a full array of collector dishes, a complete array of collectors constructed according to the present invention will require a pair of central AC generators and each separate motor will require several power wires. The AC source should produce quadrature phases to eliminate the need for two phase splitting capacitors, one for each frequency, at the individual motors. The controller is less complex if all the AC frequencies and phases are generated referenced to a single common ground.

Solar Tracker

The present invention discloses a hybrid tracking system that incorporates the known accuracy of a solar tracker with the additional ability to operate accurately during periods when the sun is not visible to photodetectors. This hybrid tracking system is usable in any solar collector mounted on a polar axis drive. This hybrid tracking system is not affected when one dish shadows another and prevents it from accurately locking onto the sun. Additionally, known solar trackers scan the solar image across the outside of the receiver when the dish is driven into proper solar alignment, which can damage the receiver. The present invention's hybrid tracker avoids this.

The present invention's tracking system begins with an "open loop" drive, where the dish is driven at a constant speed around the polar axis. Other than a daily start signal from a computer, no further corrections are given or needed. If the polar axis is aligned properly, the start time is correct, and the motor speed is accurate, polar axis aiming accuracy will be adequate. The declination axis does not require a separate drive during any given day, but between days some adjustment must be made by a computer. Such an "open loop" system is cheap and functions adequately even when the dish is shadowed by another dish or clouds.

With the cradle of the present invention, the polar axis is defined by two points (61 and 67, FIG. 5b), typically separated by 1.5 dish diameters. Given an optimum dish diameter of about 10 m, if the upper mounting pivot is properly located within 0.5 cm of its ideal position with respect to the lower mount, the polar axis will be aligned to the earth's polar axis within 0.3 milliradians ("mr"). If the drive motor is synchronous and the drive frequency is within 100 ppm of the correct value, the dish position will be correct within 0.3 mr after a 12 hour day. If the starting time is accurate within 5 seconds, the dish position will be correct within 0.3 mr. Such an open loop tracker will result in a dish position accuracy within 1 mr, which is acceptable. However, in this system, if an error occurs, it will not be corrected. Also, locating the position of point 67 (FIG. 5b) within 0.5 cm, while certainly possible, is not inexpensive or easy.

Adding a tracking system to the known open loop control system eliminates any requirement for computer control of the declination axis and relaxes the tolerance requirements for the polar axis drive by a factor of roughly three. A very simple approach is to place a group of 4 photodetectors 121 in the central part of the collector dish so that the edge of the receiver's shadow touches all four photodetectors when the dish is correctly aimed. This arrangement is shown in FIG. 21. If full sunlight strikes a photodetector 121, a signal is generated to correct the dish position until the photodetector is no longer in the sun. With the polar drive 77 and an accurately controlled motor, the tracker becomes merely an error corrector.

With a 10 m dish, the photodetectors will be about 6 m from the receiver. The solar penumbra will be an annulus about 55 mm across. The photodetectors can be operated differentially and can easily maintain an alignment within a few tenths of a mr.

Physical barriers may be installed around photodetectors 121 so that a photodetector cannot be illuminated by sunlight coming from the other side of the receiver, which can occur if a day was initially cloudy and no solar disk was visible until noon. Placing a small plastic tube of a few centimeters in height around each photodetector will suffice.

The receiver is commonly mounted to the dish by tubes 103 (FIGS. 4 and 15) that extend to the east, south and west edges of the dish. These tubes will cast shadows on photodetectors 121 and confuse the tracking system if the photodetectors are mounted on the drive axes. This problem can be eliminated if the detectors are mounted at 45° to the drive axes as shown in FIG. 21.

The schematic shown in FIG. 22 illustrates how the output of the photodetectors mounted on the concentrator dish is processed. Amplifiers 132 with their associated resistive networks form a plurality of sum and difference amplifiers. Such sum and difference amplifiers are known. As each photodetector 121 drives two sum and difference amplifiers 132, a unity gain amplifier 131 is coupled between the photodetector and amplifier to lower the source impedance to the amplifier and prevent crosstalk between the axes. Differential amplifiers 133, acting as comparators, convert the analog error signal from sum and difference amplifiers 132 to digital error signals. The comparators have built-in hysteresis to eliminate hunting by the tracker.

Further processing is needed to convert the digital error signal to the triac drive needed to switch the motors shown in FIG. 24. FIG. 23 is a block diagram showing the circuitry needed for this further processing. The four digital error signals (go North, go South, fast forward, and stop) must be gated with control signals including "the dish is not against an end-of-travel stop" in the north, south, east, or west rotations; a day signal (generated by the computer); and a TRACK signal (when the sun is visible). The signals are sent to optically coupled triac drivers 137, which each contains a triac. Although usually a triac driver triggers a power triac, in the present invention the motor power is so small that the triac driver may be adequate to drive the motor directly.

There are three RC time delay circuit elements 139. When coupled with the diodes, the delay is different by at least two orders of magnitude between the leading and falling edges. The RC time constant should be at least 25 ms. This ensures that the triac from one AC source will be off before another is turned on. It takes a half cycle at 30 Hz, or 17 ms, before all the triacs can be confirmed off. There are three potentially troublesome transitions. These are from NORMAL to FAST, from FAST to NORMAL and from forward to reverse at the end of the day. Other potential problems are avoided by gating the FAST and TRACK signals together in NAND gate 141 before the delay. Comparators 133 are designed in such a way that there is no potential switching problem in the declination drive.

The computer generates a signal called DAY. This signal starts the right ascension drive in the morning at the proper time, based on the stored equation of time. Because of shadowing between the dishes, the tracker cannot see the sun for some time after sunrise. To prevent false tracking signals during this interval, a second control signal, TRACK, is generated some time after sunrise. TRACK enables the sun tracker in both axes. TRACK is turned off prior to sunset, to avoid errors when the tracker cannot see the sun. TRACK can be generated by the computer or by a master photodetector(s) that is (are) mounted in such a way that the TRACK signal is generated only when direct sunlight is available to the tracker photodiodes 121. The photodetector has an advantage over using a computer. It can be set to turn off TRACK during cloudy weather, eliminating possible false error signals when the sun is obscured. During the intervals when DAY is valid and TRACK is not valid, the dish is driven in its open-loop mode.

As the dish is always pointed in nearly the correct direction, high speed error correction is unnecessary. The dish is driven at a nominally correct rate in right ascension. If the dish gets ahead of the sun, the motor is turned off (the STOP signal) until the sun catches up. If the dish gets behind, the motor is driven at a higher frequency (the FAST signal) to catch up. In declination, if no error is detected, nothing happens. If an error is detected, then the declination drive is run until the error is corrected. In general, the right ascension drive will be run at half its rated frequency most of the time, will stop if it gets ahead of the sun, and will run at its rated frequency if it gets behind. The declination drive is run at its rated frequency whenever an error condition exists.

System Plumbing

As stated earlier, one of the main problems in existing solar energy steam generators is leaks in the flexible couplings needed to permit the motion of the concentrator dish. Some of this problem is caused by the differential heating and cooling of various parts of the system. A failure to deal effectively with system leaks can result in the loss of water to a receiver and its consequent destruction. Considerations of system efficiency also play a role, as heat exchange between the pipes delivering water to the receiver and the pipes carrying steam to the load can increase entropy and reduce efficiency.

In the present invention, as in other known systems, a pair of insulated pipes goes to each receiver. Running an east-west trunk line across the field of dishes and north-south branch lines along each row of dishes results in the shortest total length of pipe being used. A two phase flow with water/steam mixtures flowing in the pipes has been shown to be acceptable. The trunk and branch lines are designed to be large enough to have a low pressure drop along the line. A flow restriction is made in the water line going to each receiver. Placing the flow restriction in the water line and not the steam line minimizes the resultant power loss. The flow restriction can be as simple as a small orifice in the line or a tube with a very small inner diameter. These restrictions can be adjusted so that lines near the power house have more resistance than those further away, to compensate for pressure drops along the trunk and branch lines. As five to ten times as much water is pumped through each receiver as can actually be boiled, the exact division of water between receivers does not need to be very precise.

The steam/water mixture from the receivers is put through a steam separator. The steam is supplied to the load and the water is recirculated to the receivers. The exhaust from the load is condensed and mixed with the water. The separated water has a temperature of roughly 300° C. and the condensed water has a temperature of about 50° C., with their mixture resulting in a water temperature of about 250° C. If that water is sent to the receivers through an uninsulated pipe, the heat loss will be unacceptable. However, if the water and steam lines are wrapped together with insulation around the pair, heat transfer from the steam to the water would also result in an unacceptable heat loss. Insulating the two lines separately is known and shown in FIG. 25, but is expensive because it uses twice as much insulation. The other known solution, placing both pipes within the same unit of insulation but separated from one another is difficult and differential expansion between the pipes can destroy them.

The present invention, as shown in FIG. 26, runs a pipe carrying the separated water and the pipe carrying the steam next to each other in a tightly bundled insulated unit. As the separated water and the steam are at the same temperature, no heat transfer occurs. In one embodiment of the present invention, the separated water and the condensed water are mixed immediately before entering the receivers, the condensed water being pumped through an uninsulated line. In a second preferred embodiment, the condensed water is supplied to one set of receivers and the separated water is supplied to a second set. This is illustrated in FIG. 27. The condensed water is pumped to enough receivers to raise the temperature of the condensed water to the boiling point and to boil some of it. The number of receivers supplied with condensed water should not be more than are needed to boil about 20% of the water. In most systems, a 50/50 distribution of condensed water and separated water being supplied to the receivers would be adequate. In some cases, slight power savings can be achieved by varying this ratio somewhat.

The water and steam pipes must be large enough to carry the fluids to and from the boilers without a large pressure drop. The quantity of fluid carried depends on the desired operating temperature. The calculations necessary to achieve a desired fluid flow rate and pressure drop are known and depend upon the size of the dish array, the type of pipes used and the system's operating temperatures. As these are a matter of design choice and involve known calculations, they will not be described in detail here.

In most systems, some type of flexible coupling or slip joint is used in the connection between the receiver, which moves, and the plumbing network, which does not. In known systems, these flexible couplings are expensive and prone to failure. These known couplings include hoses reinforced with a steel braid and metal swivel joints with O-ring seals. Both function better with oil at moderate pressure than high-pressure water.

Figure 28:
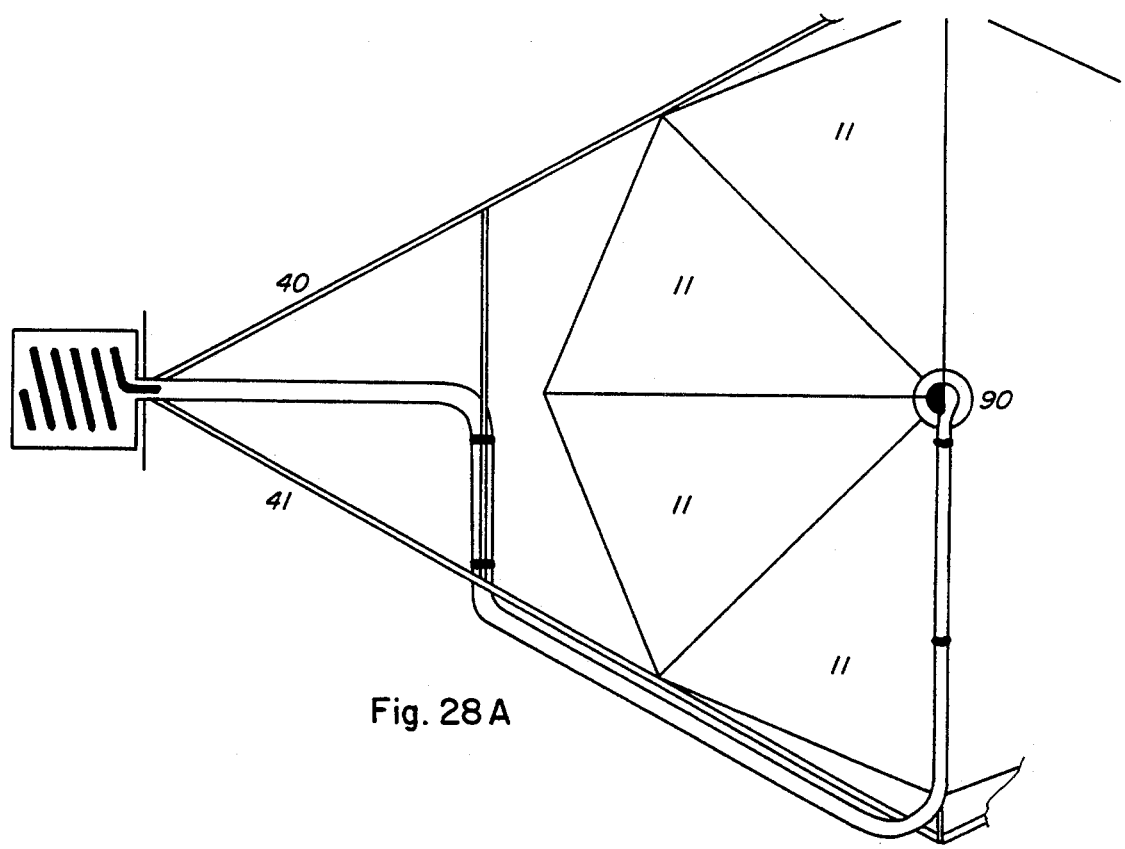
Figure 28:
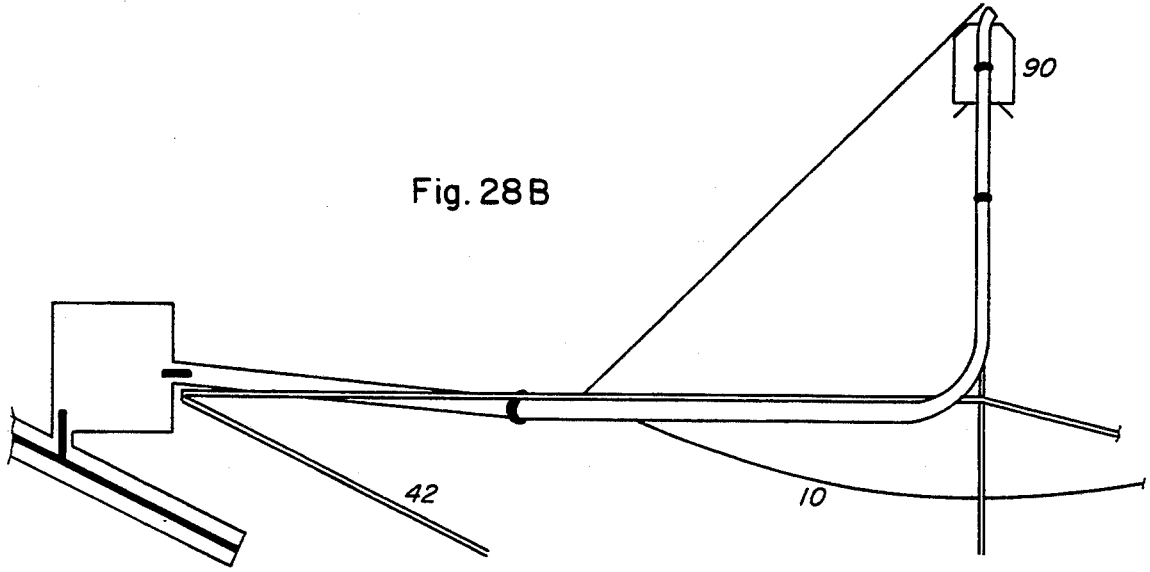

In the present invention, as shown in FIG. 28, the tubes feeding the receiver are fashioned so that the collector dish can move through its entire range with no plastic deformation of the tubes occurring. Known methods of calculating elastic flex result in a requirement that to move ±23.5° (0.41 radians)in declination with elastic deformation of the feeder tubes, the pipe's bend would have to be distributed over a length of 410 pipe radii. Around the right ascension axis, the required motion at reasonable latitudes is ±110° (1.9 radians) or less, implying a maximum required tube length of 1900 tube radii. Given the earlier calculations for system pressure loss through the pipes, the pipe's outside radius should be about the dish radius divided by 1000 for dishes receiving condensed water and twice that for dishes receiving separated water. In either case, the declination axis motion can be accommodated by flexing a length of pipe less than a dish radius. The right ascension motion requires tube lengths of 2 or 4 dish radii for the cold water and the hot water receivers, respectively.

One suitable routing of the pipes is also shown in FIG. 28. The declination axis flex is distributed over a tube length of almost two dish radii. The polar axis motion is accommodated by winding a suitable length of pipe into a coil, like a spring. This does not affect the flex calculations in any way. The pipe coil can be insulated as a unit, which helps keep insulation costs down.

The coefficient of thermal expansion for steel is 12 ppm/°C. If the operating temperature is 300° C. and winter nights can reach 0° C., then expansion will be 3600 ppm, or 3.6 m per km of pipe. A collector field powering a 20 MW generator will cover a square kilometer of land, so pipe lengths of 500 m are needed. Known techniques to accommodate expansion involve periodically placing a U-shaped section of pipe that can flex to absorb the motion. If there is no flexibility in the coupling to the receiver, then such an expansion joint must be placed between each adjacent pair of dishes.

By suspending the steam pipes from small stainless steel wires, so the pipes can expand in length without ruining the insulation, the total number of U-shaped expansion joints can be reduced. The wires will accommodate motions of up to several tenths of a meter, which allows the reduction of expansion joints to only one every 200 m. Although there must be a connection to the feeder pipes running to each separate receiver, the approximately 20 cm of motion caused by expansion of the feeder line can be accommodated by the coil spring previously described. Properly installed, the right ascension plumbing coil can easily accommodate an axial motion of ±20 cm, which is adequate for all contemplated installations.

It is understood that although the preferred embodiments of the present invention have been illustrated and described, various modifications, alternatives and equivalents thereof will become apparent to those skilled in the art, and accordingly, the scope of the present invention should be defined only by the appended claims and equivalents thereof.

What is claimed is:

1. A system for generating steam using solar energy, the system comprising:
   a concentrator dish for receiving, concentrating and focusing the solar energy on a first focal area, the dish having a reflective front surface and bracing members extending a predetermined distance behind the reflective surface of the dish;
   a receiver mounted on the concentrator dish at the first focal area for receiving the solar energy focused by the concentrator dish and for transferring the solar energy to a working fluid;
   a cradle forming a gimbal mount for mounting the concentrator dish and the receiver, the cradle being movable around a polar axis and permitting the concentrator dish and its bracing members to move around both a polar axis and a declination axis within the cradle, the cradle delivering all forces along the polar axis to the earth at the end of the cradle nearest the equator, the cradle comprising 12 members, one of which may comprise the concentration dish and only one of which experiences flexural forces;
   a solar tracking system to maintain a solar image upon the receiver;
   a computer controlled positioning system to maintain the dish's position in the absence of the solar image;
   a first reversible drive system coupled to the concentrator dish for driving the concentrator dish around the declination axis;
   a second reversible drive system coupled to the concentrator dish for driving the concentrator dish around the polar axis; and
   a plumbing system mounted on the cradle and concentrator dish and coupled to the receiver for carrying a working fluid to the receiver and for carrying heated working fluid from the receiver to a load.

2. An internal receiver for transferring concentrated solar energy to a working fluid, the receiver comprising:
   a circular aperture through which the concentrated solar energy enters the receiver;
   a cavity with walls extending behind the aperture, the cavity having a deep pointed shape and being designed to maximize blackness in a cavity of minimum length;
   a pressure vessel surrounding the cavity, the pressure vessel forming a cylinder around the cavity and being attached thereto, the pressure vessel having a circular rear surface;
   a working fluid input line for injecting the working fluid into the pressure vessel where the concentrated solar energy absorbed by the walls of the cavity can be transferred as heat energy to the working fluid;
   a working fluid output line for carrying heated working fluid from the pressure vessel to a load the fluid input line comprises a single fluid input line coupled to the center of the pressure vessel's circular rear surface and the fluid output line comprises a pair of fluid output lines coupled to the perimeter of the circular rear surface, the pair of fluid output lines insuring that the cavity wall remains wet as the receiver approaches a horizontal position.

3. A cradle for a solar concentrator dish, the cradle permitting the dish to move around a polar axis and a declination axis, the cradle comprised of twelve members, the members each having a first and a second end, the twelve members forming a first, second, and third tetrahedron, each tetrahedron having six edges and four vertices, the first tetrahedron comprising the first, second, third, fourth, fifth, and sixth members and the first tetrahedron's vertices comprising:
   a first vertex comprising the first ends of the first, second, and third members;
   a second vertex comprising the second ends of the second member, the first end of the fourth member, and the first end of the sixth member;
   a third vertex comprising the second end of the third member, the second end of the fifth member, and the second end of the sixth member; and a fourth vertex comprising the second end of the first member, the first end of the fifth member, and the second end of the fourth member;

the second tetrahedron comprising the fourth, fifth, sixth, seventh, eighth, and ninth members and the second tetrahedron's vertices comprising:

a first vertex comprising the first ends of the fourth, sixth, and seventh members;

a second vertex comprising the first ends of the fifth and ninth members and the second end of the fourth member;

a third vertex comprising the second end of the fifth and sixth members and the first end of the eighth member; and a fourth vertex comprising the second ends of the seventh, eighth, and ninth members;

the third tetrahedron comprising the sixth, seventh, eighth, tenth, eleventh, and twelfth members and the third tetrahedron's vertices comprising:

a first vertex comprising the first ends of the sixth, seventh and tenth members;

a second vertex comprising the second end of the sixth member and the first ends of the eighth and eleventh members;

a third vertex comprising the second ends of the seventh and eighth members and the first end of the twelfth member; and a fourth vertex comprising the second ends of the tenth, eleventh, and twelfth members.

4. The cradle of claim 3 wherein the sixth member comprises the concentrator dish, a first and second point of the concentrator dish's comprises the first and second ends of the sixth member, the first and second point being separated by at least the diameter of the concentrator dish.

5. The cradle of claim 4 wherein the twelfth member extends from the third vertex of the third tetrahedron through the fourth vertex, the end of the extension and the first vertex of the first tetrahedron comprising the polar axis of rotation for the concentrator dish.

6. The cradle of claim 5 wherein a circular drive track is coupled to the second, third, and fourth vertices of the first tetrahedron, the circular drive track having a fitting for of a drive for rotating the concentrator dish around the polar axis.

7. The system of claim 1 wherein the twelve members, one of which comprises the concentrator dish each have a first and a second end, the twelve members forming a first, second, and third tetrahedron, each tetrahedron having six edges and four vertices, the first tetrahedron comprising the first, second, third, fourth, fifth, and sixth members and the first tetrahedron's vertices comprising:

a first vertex comprising the first ends of the first, second, and third members;

a second vertex comprising the second ends of the second member, the first end of the fourth member, and the first end of the sixth member;

a third vertex comprising the second end of the third member, the second end of the fifth member, and the second end of the sixth member; and a fourth vertex comprising the second end of the first member, the first end of the fifth member, and the second end of the fourth member;

the second tetrahedron comprising the fourth, fifth, sixth, seventh, eighth, and ninth members and the second tetrahedron's vertices comprising:

a first vertex comprising the first ends of the fourth, sixth, and seventh members;

a second vertex comprising the first ends of the fifth and ninth members and the second end of the fourth member;

a third vertex comprising the second end of the fifth and sixth members and the first end of the eighth member; and a fourth vertex comprising the second ends of the seventh, eighth, and ninth members;

the third tetrahedron comprising the sixth, seventh, eighth, tenth, eleventh, and twelfth members and the third tetrahedron's vertices comprising:

a first vertex comprising the first ends of the sixth, seventh and tenth members;

a second vertex comprising the second end of the sixth member and the first ends of the eighth and eleventh members;

a third vertex comprising the second ends of the seventh and eighth members and the first end of the twelfth member; and a fourth vertex comprising the second ends of the tenth, eleventh, and twelfth members and wherein the sixth member of the cradle comprises the concentrator dish, a first and second point on the concentrator dish's perimeter comprises the first and second ends of the sixth member, the first and second point being separated by at least the diameter of the concentrator dish.

8. The system of claim 1 wherein the plumbing system comprises input and output pipes, the input and output pipes being wound in helical coils, the helical coils absorbing the polar rotation of the dish by means of elastic deformation.

9. The system of claim 1 wherein the receiver comprises:

a circular aperture through which the concentrated solar energy enters the receiver;

a cavity with walls extending behind the aperture, the cavity having a deep pointed shape designed to maximize blackness in a minimum depth;

a pressure vessel surrounding the cavity, the pressure vessel forming a cylinder around the cavity and being attached thereto, the pressure vessel having a circular rear surface;

a working fluid input line for injecting the working fluid into the pressure vessel where the concentrated solar energy absorbed by the walls of the cavity can be transferred as heat energy to the working fluid; and a working fluid output line for carrying heated working fluid from the pressure vessel to a load.

10. The system of claim 9 wherein a conical secondary reflector is coupled to the circular aperture, the secondary reflector reflecting additional light into the cavity, the reflector also reducing convective heat loss from the receiver.

11. The receiver of claim 2 wherein a conical secondary reflector is coupled to the circular aperture, the secondary reflector reflecting additional light into the cavity, the reflector also reducing convective heat loss from the receiver.

12. The system of claim 9 wherein the fluid input line comprises a single fluid input line coupled to the center of the pressure vessel's circular rear surface and the fluid output line comprises a pair of fluid output lines coupled to the perimeter of the circular rear surface, the pair of fluid output lines insuring that the cavity wall remains wet at the extremes of the dish's polar axis travel.

13. The system of claim 1 wherein the concentrator dish is comprised of a plurality of wedge-shaped segments, radial ribs comprised of a flat metal sheets extending from the center of the dish to the edge of the dish, adjacent wedge-shaped segments being coupled together by and attached to a radial rib, a central pole extending behind the dish from the center of the dish, and a plurality of bracing poles, each bracing pole being coupled to the end of the central pole behind the dish and to a radial rib.

14. The cradle of claim 5 wherein the end of the extension attaches to a guyed pole and the first vertex of the first tetrahedron attaches to a thrust bearing attached to a mounting base.

15. The receiver of claim 11 wherein the side of the secondary reflector facing the dish is reflective and the other side of the secondary reflector is blackened.

16. The system of claim 1 wherein the plumbing system comprises input and output pipes, the input and output pipes absorbing the declination rotation of the concentrator dish by means of elastic deformation.

* * * * *